(12) United States Patent
Yang et al.

(10) Patent No.: US 10,685,553 B2
(45) Date of Patent: Jun. 16, 2020

(54) CONTEXT-BASED ALERTS FOR AN ELECTRONIC DEVICE

(71) Applicant: Apple Inc., Cupertino, CA (US)

(72) Inventors: Lawrence Yang, San Francisco, CA (US); Jonathan R. Dascola, San Francisco, CA (US); Camille Moussette, Los Gatos, CA (US); Hugo D. Verweij, San Francisco, CA (US); Jonah A. Harley, Los Gatos, CA (US); John B. Morrell, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/226,535

(22) Filed: Dec. 19, 2018

(65) Prior Publication Data

US 2019/0122528 A1  Apr. 25, 2019

Related U.S. Application Data

(63) Continuation of application No. 15/595,593, filed on May 15, 2017, now Pat. No. 10,210,743, which is a
(Continued)

(51) Int. Cl.
*G08B 23/00* (2006.01)
*H04M 1/725* (2006.01)
(Continued)

(52) U.S. Cl.
CPC ........ *G08B 23/00* (2013.01); *H04M 1/72569* (2013.01); *H04M 19/04* (2013.01); *H04W 52/0209* (2013.01); *H04M 1/7253* (2013.01); *H04M 2250/12* (2013.01); *Y02D 70/00* (2018.01); *Y02D 70/142* (2018.01); *Y02D 70/144* (2018.01); *Y02D 70/164* (2018.01); *Y02D 70/26* (2018.01)

(58) Field of Classification Search
CPC ......... A61B 5/74; A61B 5/7405; A61B 5/742; A61B 5/7455; A61B 5/746; G08B 3/00; G08B 5/00; G08B 6/00; G08B 7/00
See application file for complete search history.

(56) References Cited

U.S. PATENT DOCUMENTS

| 6,477,117 B1 | 11/2002 | Narayanaswami |
| 7,151,954 B2 | 12/2006 | Nagata |
| (Continued) | | |

FOREIGN PATENT DOCUMENTS

WO    WO 06/057770    6/2006

*Primary Examiner* — Andrew W Bee
(74) *Attorney, Agent, or Firm* — Brownstein Hyatt Farber Schreck, LLP

(57) ABSTRACT

Embodiments of the present disclosure provide a system and method for providing an output for an electronic device. In certain embodiments, an alert is output in accordance with a current alert mode, which are selected based on one or more environmental conditions. The environmental conditions may be detected using one or more environmental sensors. The alert can optionally include one or more of: an audio component, a haptic component and a visual component. One or more of alert components correspond to an aspect of the environmental condition detected by the one or more environmental sensors.

16 Claims, 23 Drawing Sheets

Related U.S. Application Data continuation of application No. 14/503,339, filed on Sep. 30, 2014, now Pat. No. 9,659,482.

(60) Provisional application No. 62/044,657, filed on Sep. 2, 2014.

(51) Int. Cl.
  *H04M 19/04* (2006.01)
  *H04W 52/02* (2009.01)

(56) References Cited

U.S. PATENT DOCUMENTS

| | | | |
|---|---|---|---|
| 7,469,155 B2 | 12/2008 | Chu | |
| 8,195,203 B1* | 6/2012 | Tseng | H04M 1/72569 455/457 |
| 8,823,507 B1* | 9/2014 | Touloumtzis | H04L 67/24 340/501 |
| 9,031,812 B2 | 5/2015 | Roberts et al. | |
| 9,143,898 B1 | 9/2015 | Barr | |
| 9,507,418 B2 | 11/2016 | Yu et al. | |
| 9,526,127 B1* | 12/2016 | Taubman | H04W 88/02 |
| 9,659,482 B2 | 5/2017 | Yang et al. | |
| 2003/0017859 A1 | 1/2003 | Martinez | |
| 2004/0127198 A1 | 7/2004 | Roskind | |
| 2005/0018834 A1 | 1/2005 | Furnas | |
| 2006/0014569 A1 | 1/2006 | DelGiorno | |
| 2006/0088153 A1 | 4/2006 | Wille | |
| 2006/0116175 A1* | 6/2006 | Chu | H04M 1/72569 455/567 |
| 2007/0091836 A1 | 4/2007 | Oprescu-Surcobe | |
| 2007/0192067 A1 | 8/2007 | Wong | |
| 2008/0090537 A1 | 4/2008 | Sutardja | |
| 2008/0125184 A1 | 5/2008 | Sano | |
| 2009/0088221 A1 | 4/2009 | Gilbert | |
| 2009/0167542 A1 | 7/2009 | Culbert | |
| 2010/0215170 A1 | 8/2010 | Kannappan | |
| 2011/0175932 A1* | 7/2011 | Yu | G06F 3/013 345/661 |
| 2014/0085077 A1 | 3/2014 | Luna | |
| 2014/0240122 A1* | 8/2014 | Roberts | G16H 40/63 340/539.11 |
| 2014/0253323 A1 | 9/2014 | Berven | |
| 2014/0368333 A1 | 12/2014 | Touloumtzis | |
| 2015/0009096 A1 | 1/2015 | Lee | |
| 2015/0065095 A1 | 3/2015 | Seo | |
| 2016/0004224 A1 | 1/2016 | Pi | |
| 2016/0034042 A1 | 2/2016 | Joo | |
| 2016/0277891 A1 | 9/2016 | Dvortsov | |
| 2017/0004685 A1 | 1/2017 | Karsten | |
| 2017/0337804 A1 | 11/2017 | Yang et al. | |
| 2018/0042526 A1 | 2/2018 | Hong | |

* cited by examiner

CONTEXT-BASED ALERTS FOR AN ELECTRONIC DEVICE

CROSS-REFERENCE TO RELATED APPLICATIONS

This application is a continuation of U.S. patent application Ser. No. 15/595,593, filed May 15, 2017, and entitled "Context-Based Alerts for an Electronic Device," which is a continuation of U.S. patent application Ser. No. 14/503,339, filed Sep. 30, 2014, and entitled "Context-Based Alerts for an Electronic Device," now U.S. Pat. No. 9,659,482, which claims the benefit under 35 U.S.C. § 119(e) of U.S. Provisional Patent Application No. 62/044,657, filed Sep. 2, 2014, and entitled "Context-Based Alerts for an Electronic Device," all of which are incorporated by reference as if fully disclosed herein.

TECHNICAL FIELD

Generally, the present disclosure is directed to selecting and providing an alert level for an electronic device. Specifically, the present disclosure is directed to providing an alert that is selected from a set of three or more alert modes based on one or more environmental conditions associated with the electronic device.

BACKGROUND

Electronic devices have become ubiquitous in our daily lives. Certain electronic devices including, cell phones, tablet computers, personal digital assistants, and the like have become common items in the workplace and at home. Some of these electronic devices include an ability to notify a user particular item of interest, such as, for example, an incoming phone call, or may otherwise attempt to gain the user's attention through the use of an alarm or signal.

SUMMARY

In many electronic devices, certain qualities of the notification are either fixed or must be manually adjust by the user to accommodate different environmental conditions. However, depending on the operating environment of the device, the notification may be undesirable or inappropriate. It is with respect to these and other general considerations that embodiments of the present disclosure have been made. Also, although relatively specific problems have been discussed, it should be understood that the embodiments disclosed herein should not be limited to solving the specific problems identified in the background.

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide a system and method for providing an alert in response to detecting an occurrence of an event. In some embodiments, in response to detecting the occurrence of the event, a response to the event is determined based on a current alert mode selected from a set of three or more alert modes. The selection may be based on the one or more environmental conditions. In accordance with a determination that the current alert mode is a first alert mode, a first alert may be output in response to the event. In accordance with a determination that the current alert mode is a second alert mode, a second alert may be output in response to the event. The second alert may be different from the first alert.

Embodiments of the present disclosure provide a system and method for forgoing an alert in response to detecting a level of user activity or receiving a number or event notifications that are below a threshold. In some embodiments, in response to detecting the event, an output of an alert is forgone, in accordance with a determination that an activity level exceeds a threshold. The alert is output in accordance with a determination that the activity level does not exceed the threshold. In some embodiments, in response to detecting the event, an alert is output in accordance with a determination that a number of events that have been detected over a predetermined period exceeds a threshold. The output of an alert is forgone in accordance with a determination that the number of events that have been detected over the predetermined period does not exceed the threshold.

Embodiments of the present disclosure provide a system and method for providing a modified alert sequence in response to detecting an interaction by the user. In some embodiments, a portion of an alert sequence is output. An interaction with the user is detected during the outputting of the portion of the alarm sequence, and in response to detecting the interaction, a modified alert sequence is selected in response to the input. The modified alert sequence is output using the device.

Embodiments of the present disclosure provide a system and method for selecting a device to output an alert in response to detecting another device that is in proximity to the electronic device. In some embodiments, in response to detecting an event, an alert-output device is selected in accordance with a determination that a second device is in proximity to the first device, and the alert is output on the alert-output device.

Embodiments of the present disclosure provide a system and method for providing an audio and haptic output that depends on the speed of a user input. In some embodiments, a first input is received on the that is below an input threshold. In response to detecting the first input, a first output is produced using the device. The first output includes a haptic component for the first input that is coordinated with an audio component for the first input. A second input is received on the device, and in response to detecting the second input, a second output is produced. In accordance with a determination that the second input is below the input threshold, the second output includes a haptic component for the second input that is coordinated with an audio component for the second input, and in accordance with a determination that the second input is above the input threshold, the second output includes a modified haptic component for the second input.

DETAILED DESCRIPTION

Figure 1A:
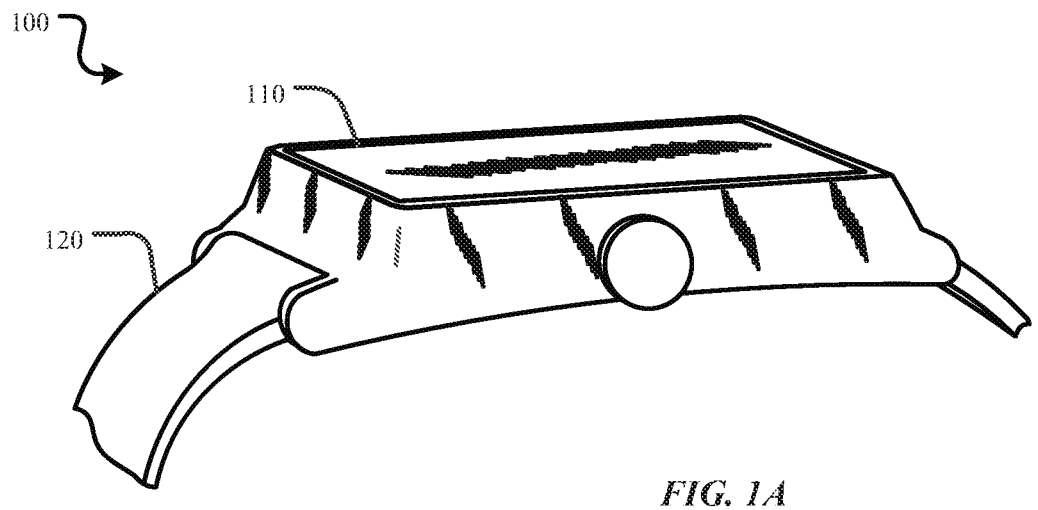
FIGS. 1A-B depict example electronic devices that may be used to provide an alert according to one or more embodiments of the present disclosure.

As discussed above, embodiments of the present disclosure provide a system and method for producing an alert according to an alert mode that is automatically selected based on one or more environmental conditions. The environmental conditions optionally relate to the ambient conditions in which the electronic device is being operated. In some implementations, the electronic device detects or senses the environmental conditions using one or more sensors associated with an electronic device. The output from the one or more sensors is, optionally used to determine or estimate certain qualities of the environmental conditions or operating environment of the electronic device, including, for example, noise level, light level, motion level, and the like. Based on the one or more environmental conditions, an alert mode is, optionally selected from a set of three or more alert modes. In response to detecting the occurrence of an event, the device optionally produces an alert, in accordance with the selected alert mode that corresponds to the one or more environmental conditions.

Each alert mode may define a distinct alert that may include multiple components that provide different types of stimuli to the user. For example, an alert mode may define an audio component, a visual component, and/or a haptic component. Additionally, an alert mode may define a relative timing between components. For example, the alert mode optionally defines a slight delay between an audio component and a haptic component to produce a composite stimulus that is more readily detected by the user in some situations. The components of the alert, including the relative timing of the components, can be varied to provide a composite stimulus that is tailored to a particular scenario or set of environmental conditions. In some cases, the alert mode can be automatically selected based on the one or more environmental conditions that are detected.

In some embodiments, the environmental sensor is a microphone that is configured to detect an ambient sound level. The alert mode may be selected based on ambient sound level detected by the sensor. In some cases, the selected alert mode includes an audio component that corresponds to or is appropriate for the ambient sound level detected by the sensor. In some cases, the environmental sensor is a motion sensor that is configured to detect an activity level, which is used to select an alert mode. The alert mode that is selected can have an audio component, a haptic component, and/or visual component that corresponds to detected the activity level. In some cases, the environmental sensor is an image sensor that is configured to detect an ambient light level, which is used to select an alert mode. In some cases, one or more sensors are configured to detect a current battery level, which can, optionally be used to select an alert mode that conserves power or reduced peak power usage. For example, by separating the timing of audio and haptic alert components of an alert the peak power output may be reduced. Also, by reducing the amplitude of audio and/or haptic alert components, the peak power output may be reduced.

In some implementations, the alert is tailored to represent a series of events that are detected over a predetermined time. In some embodiments, a series of closely occurring events results in a single, batched alert instead of triggering a series of individual alerts for each event. For example, a series of text messages may be received over a relatively short time period. Instead of producing a separate alert for each text message, an alert output may be held or forgone for a period of time and then a single, batched output may be produced. A combined or batched alert may be useful, for example, when a large number of event occur over a period of time, or when the time between events is very small. In these cases, producing a single alert may be more effective in capturing the user's attention and may also prevent alert fatigue. For example, if a user receives a large number of alerts over a short time period, or receives a nearly continuous stream of alerts, the user may begin to ignore or disregard the alerts.

In one specific example, the number of events that occur over a period of time are monitored by the device. If the number of events is less than a threshold amount, the device can, optionally forgo outputting an alert. However, once the number of events exceeds the threshold, a composite or batched alert can, optionally be produced or output by the device. Events that are monitored include, without limitation, receiving an e-mail, receiving a phone call, receiving a message, and/or receiving calendar reminder.

In some implementations, an alert is conditionally delayed or forgone while a user is active. If, for example, the user is engaged in exercise or heavy activity, the stimulus provided by an alert may not be readily detected. Thus, in some cases it may be advantageous to monitor or detect a user's activity level and, if an event occurs during a period of high or heavy activity, the alert associated with that event is, optionally delayed or forgone until the activity is below a threshold level. In some implementations, the activity level is based on the movement of the device, as detected by one or more motion sensors, or using one or more biometric sensors that are configured detect a user's physiological state, such as a pulse or blood oxygenation.

In some implementations, an alert is a sequence of alert outputs that are configured to escalate by producing a stimulus or output that increases in intensity over time. In some cases, the escalation sequence or progression of the alert is interrupted and caused to be modified due to a user interaction with the device. In some embodiments, an escalating alert sequence is output by the device up until receiving an input from the user or other interaction from the user. (e.g., the user may touch the screen of the device or provide another form of input that is detected by the device.) In response to receiving the input, the device may select and output a modified alert sequence. In the case that the original alert sequence included an intensifying stimulus, the modified alert sequence may be non-escalating or have a substantially uniform stimulus.

In some implementations, the device is configured to detect or determine if another device is in proximity to the user when an event is received or detected. The device can, conditionally determine which device is appropriate for outputting an alert associated with the event. In some implementations, the alert is output on only one of the devices that are determined to be in proximity to the user. The appropriate device can be selected based on a number of different criteria. For example, the last device that has been used by the user can be selected. Additionally or alternatively, the device that the user is currently interacting with or is predicted to be most likely to capture the user's attention can be selected to output the alert. This feature may be advantageous in reducing the number of alerts that are output and increase the likelihood that the alert will capture the user's attention.

In some implementations, the device is configured to produce a stimulus that provides feedback for a user-action or input to the device. This feature may be advantageous for some user input components, such as electronic sensors, that may have few or no moving parts to provide feedback to the user that an input is being received. For example, when a user scrolls through a list of items using a touch screen, an audio click and/or a haptic tap may indicate the progression through the list. This may be more readily perceived by the user or more satisfying than, for example, the visual scrolling of the items alone. In some cases, the stimulus may be adapted to mimic a sound or haptic response that the user may associate with a more traditional mechanical device. In some embodiments, an audio and/or haptic output corresponds to a user input using, for example, an electronic dial or button.

For example, a user can, optionally provide an input on a device used to drive a function or task and a synchronized audio and haptic response is used to provide the user with feedback. In some cases, if the feedback corresponds to the speed of the input, it may be possible to exceed the mechanical response of, for example, a haptic actuator used to produce the feedback. Thus, in some cases, it may be beneficial to monitor or detect the speed of the user input and transition the haptic output from, for example, a synchronous to an asynchronous or continuous output when the speed of the input exceeds a threshold.

Figure 1B:
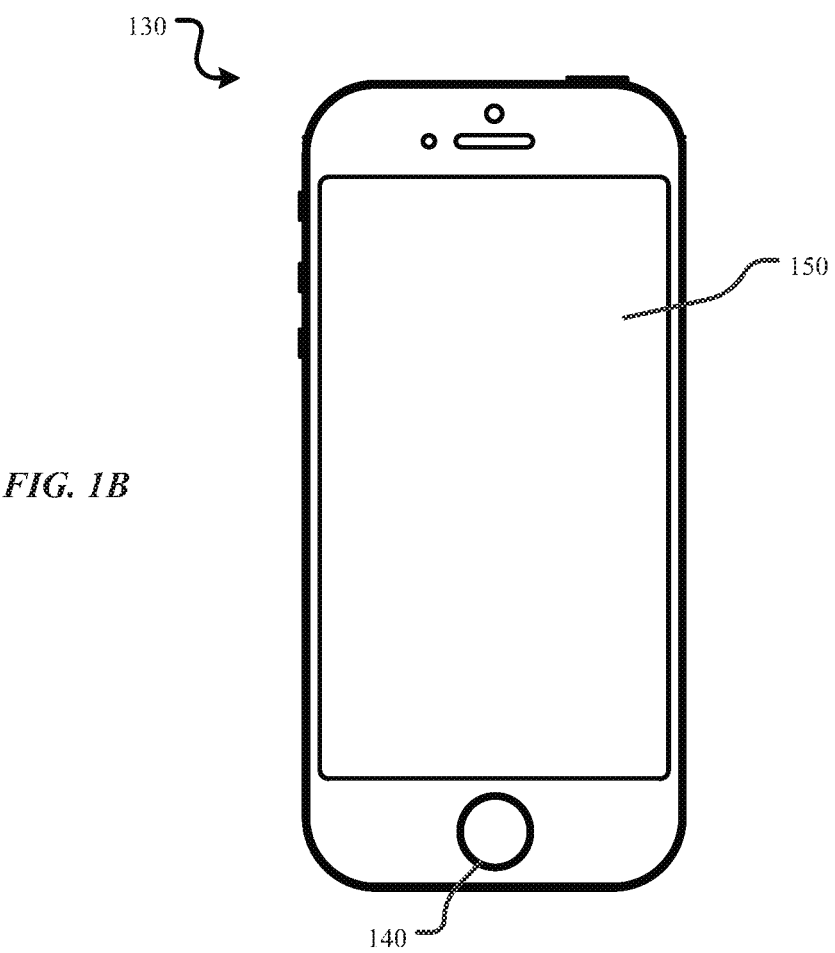

The implementations described above may be implemented on an electronic device that is configured to produce one or more forms of output to the user. FIGS. 1A-B illustrate exemplary electronic devices 100 and 130 respectively that can be used to provide an alert or other output according to one or more embodiments of the present disclosure. In certain embodiments, each of the electronic devices 100 and 130 are portable computing devices. For example, as shown in FIG. 1A, the electronic device 100 is a wearable electronic device. In some embodiments, as shown in FIG. 1B, the electronic device 130 is a mobile phone. Although specific examples have been given, additional electronic devices may be used. For example, the electronic device of the present disclosure can include various types of portable computing devices, including tablet computers, laptop computers, time keeping devices, computerized glasses, navigation devices, sports devices, portable music players, health devices, medical devices and the like.

As shown in FIG. 1A, the wearable electronic device 100 included a display 110. The display 110 can, optionally be formed from a liquid crystal display (LCD), organic light emitting diode (OLED) display, organic electroluminescence (OEL) display, or other type of display device. The display 110 can, optionally also include or be integrated with a touch sensor configured to accept touch input from the user over an input area. In some implementations, the input area covers the entire area of the display 110 or a portion of the display 110. In some implementations, the touch sensor is able to detect and measure a location and/or a force of a touch in the input area. The electronic device 130 also includes one or more buttons 140 or components for receiving input from the user.

The display 110 is configured to present various forms of visual output to the user. For example, the display 110 can, optionally provide a user interface that outputs information generated or received by the wearable electronic device 100. In some instances, the display 110 presents information corresponding to one or more applications that are executed or stored on the electronic device 100 and/or information related to communications received by the electronic device 100. Such applications can, optionally include e-mail applications, phone applications, calendaring applications, game applications, time keeping applications and the like. In some implementations, the display 110 also provides a visual output that corresponds to an alert associated with an event detected by or received by the wearable electronic device 100. Example events include, without limitation, receiving an e-mail message, receiving a phone call, receiving a text message, receiving calendar reminder, and the like.

As shown in FIG. 1B, the electronic device 130 can, optionally also include a mobile phone or other such computing device. The electronic device 130 includes a display 150 for providing an visual output generated or received by electronic device 130, as described above with respect to FIG. 1A, including the output of a visual component of an alert. The display 150 can, optionally also include or be integrated with a touch sensor configured to detect and measure a location and/or a force of a touch of touch input provided by the user.

The wearable electronic device 100 and the electronic device 130 can, optionally also include other devices or components for producing output, including, without limitation, a speaker, buzzer, or other device configured to generate an audio output. An audio output can be used as part of an alert produced by the device. As previously mentioned, an alert can, optionally include an audio component as part of a composite alert that includes multiple forms of stimuli, including, audio, visual, and/or haptic components. In some implementations, an audio output is also used to provide feedback to the user that is related to an action or function being performed on the device. In some embodiments, described in more detail below, an audio output corresponds to a user input to provide the user with feedback that the input is being received by the device.

The wearable electronic device 100 and the electronic device 130 can, optionally also include other components for producing a visual output, including, for example, a light beacon, a light source, a glowing component, a display, or the like. Components that are configured to produce a visual output can be used to provide a visual component of an alert. In some implementations, the output produced by these components is combined with the visual output of the display 110, 150, and other components as part of a composite or multi-stimulus alert.

The wearable electronic device 100 and the electronic device 130 can, optionally also include a haptic actuator for producing a haptic output that may be perceived as a stimulus by the user. The haptic output can be used as part of an alert produced by the device. As previously mentioned, the haptic output can, optionally form part an alert associated with an event detected or received by the device 100, 130. In particular, the haptic output can form a haptic component of a (composite) alert that includes multiple forms of stimuli, including, audio, visual, and/or haptic components. The haptic output can also be used to provide feedback to the user that is related to an action or function being performed on the device. In some embodiments, described in more detail below, a haptic output corresponds to a user input to provide the user with feedback that the input is being received by the device.

The wearable electronic device 100 can, optionally also include a band 120 or a strap that is used to connect or secure the wearable electronic device 100 to a user. In some embodiments, the wearable electronic device 100 includes a lanyard or necklace. In some embodiments, the wearable electronic device 100 is secured to or within another part of a user's body. In these and other embodiments, the strap, band, lanyard, or other securing mechanism can, optionally include one or more electronic components or sensors in wireless or wired communication with an accessory. For example, the band 120 can, optionally include a haptic actuator that is configured to produce a haptic output that may be sensed on the wrist of the user. In some embodiments, the band 120 also includes a component for producing an audio and/or visual output, similar to as discussed above with respect to the device 100, 130. Additionally, in some embodiments, the band 120 includes one or more sensors, an auxiliary battery, a camera, or any other suitable electronic component.

The wearable electronic device 100 and the electronic device 130 can, optionally also include one or more sensors for monitoring and detecting environmental conditions. Some example sensor components are described in more detail with respect to FIGS. 8-9. In the present example, the devices 100, 130 include a microphone or other type of acoustic sensor that is configured to receive acoustic input from the user of from the surrounding environment. In some implementations, the microphone or acoustic sensor are configured to function as environmental sensors that are adapted to receive ambient sound. In some cases, the microphone and other components of the devices 100, 130 are configured to determine an ambient sound level. In some embodiments, the devices 100, 130 are configured to activate the microphone over a predetermined period of time and record ambient sounds that are received. In some embodiments, the recorded signals are be processed to eliminate or reduce outlier input and compute an average or representative audio input. The processed audio signals can be used to determine an ambient sound level.

In the present example, the devices 100, 130 also include one or more motion sensors that are configured to detect motion of the device. In some implementations, the motion sensor(s) includes one or more of: an accelerometer, a gyro-sensor, a tilt sensor, rotation sensor, and the like. In some implementations, the motions sensor or sensors are configured to function as an environmental sensor that is adapted to detect overall activity of the user. In some embodiments, the devices 100, 130 are configured to activate or receive input from the motion sensor(s) over a predetermined period of time and record the motion of the device. In some embodiments, the number of motion events and the magnitude of the events are be used to compute or determine an estimated activity level of the user.

The devices 100, 130 can, optionally also include one or more optical sensors that are configured to function as an environmental sensor. The one or more optical sensors may include, for example, an ambient light sensor (ALS), an image sensor (camera), an optical proximity sensor and the like. In some implementations, the one or more optical sensors are used to determine an ambient light level surrounding the device. In some embodiments, the one or more optical sensors are configured to estimate the environmental lighting conditions based on an optical signal or amount of light received by the one or more sensors. Additionally or alternatively, the one or more optical light sensors can be used to detect the user's face and determine whether or not the user is likely to notice a visual output of the device.

In addition, the devices 100, 130 can, optionally include other types of environmental sensors for collecting information about one or more environmental conditions. For example, the devices 100, 130 may also include a temperature sensor, a barometric pressure sensor, a moisture sensor, a humidity sensor, a magnetic compass sensor, and the like. These sensors can be used alone or in combination to determine or estimate an environmental condition surrounding the device 100, 130.

Although not shown in FIGS. 1A-B, the wearable electronic device 100 and the electronic device 130 can, optionally include a processor, a memory, and other components. These components, as well as other components of an exemplary computing device are described in more detail below with respect to FIGS. 8-9. Further, the wearable electronic device 100 and the electronic device 130 can also, optionally include or be integrated with other components, including, for example, a keyboard or other input mechanism. Additionally, in some embodiments, the devices 100, 130 include one or more components that enable the devices 100, 130 to connect to the internet and/or access one or more remote databases or storage devices. In some embodiments, the devices 100, 130 also enable communication over wireless media such as acoustic, radio frequency (RF), infrared, and other wireless media mediums. Such communication channels can be configured to enable the devices 100, 130 to remotely connect and communicate with one or more additional devices such as, for example, a laptop computer, tablet computer, mobile telephone, personal digital assistant, portable music player, speakers and/or headphones and the like.

Figure 2:
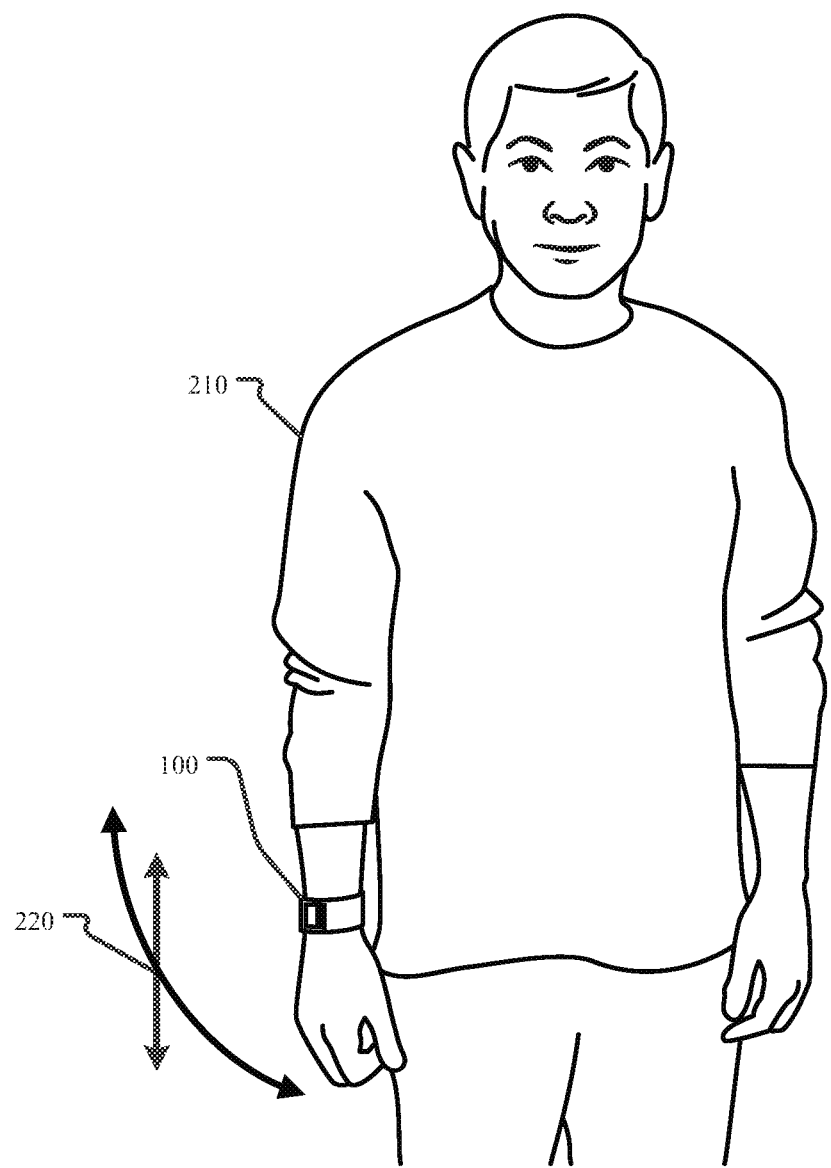
FIG. 2 depicts an example electronic device being worn by a user according to one or more embodiments of the present disclosure.

FIG. 2 depicts an example electronic device being worn by a user and subjected to one or more environmental conditions according to one or more embodiments of the present disclosure. FIG. 2 may represent an electronic device 100 subjected to one or more environmental conditions that may relevant to the user's potential interaction with the device 100, particularly an alert or stimulus produced by the device. For example, as shown in FIG. 2, the device 100 may be subjected to motion 220 due to movement or activity of the user 210. As shown in FIG. 2, the motion 220 may include movement in more than one direction and may also include a combination of rotational and translational movement. As described above with respect to FIGS. 1A-B, the device 100 can, optionally include one or more motion sensors that are configured to produce an output that can be used to compute or determine an activity level of the user 210. In some cases, the activity level of the user, as detected by the one or more motion sensors, is indicative of the ability of the user 210 to perceive certain types of stimuli. In some implementations, an appropriate alert mode is selected that corresponds to the user's activity level. In some cases, the alert mode that is selected has one or more components (e.g., audio, haptic, visual) that correspond to the activity level of the user 210. Additionally, or alternatively, the activity level of the user 210 can, conditionally be used to forgo or delay the output of an alert until the user 210 is at rest and may be more likely to perceive the alert.

In addition, the device 100 may be subjected to particular type acoustic environmental condition or conditions. For example, if the user 210 is walking through a crowded area or in a noisy environment, the device 100 may be subjected to loud or high acoustic level environmental conditions. Conversely, the device 100 may be subjected to quiet or low acoustic level environmental conditions if, for example, the user 210 is alone in a room or interior space. As described above with respect to FIGS. 1A-B, the device can, optionally include a microphone or other acoustic sensor that is configured to produce an output that can be used to compute or determine an ambient sound level surrounding the user 210. In some implementations, the ambient sound level detected by the sensor(s) is indicative of the user's 210 ability to perceive certain types of stimuli. In some implementations, an appropriate alert mode is selected that corresponds to the ambient sound level. In some cases, the alert mode that is selected has one or more components (e.g., audio, haptic, visual) that correspond to the acoustic level detected by the sensor(s).

With respect to FIG. 2, the device 100, may also be subjected to ambient lighting conditions, which may be detected using one or more optical sensors, as described above with respect to FIGS. 1A-B. For example, the one or more optical sensors are able to detect low level or dark lighting conditions, which may be consistent with the user 210 being located in a movie theater, presentation, or other quiet area. Similarly, the one or more optical sensors are also be able to detect if the device 100 is being subjected to sunlight conditions, which may be consistent with an outdoor setting or open public area. In some implementations, an appropriate alert mode is selected based on the ambient lighting conditions. In some cases, the alert mode that is selected has one or more components (e.g., audio, haptic, visual) that correspond to the light level detected by the sensor(s).

Additionally, the output from one or more types of sensors can be combined to detect an environmental condition or set of conditions. Specifically, in some embodiments, the light sensor(s), acoustic sensor(s), and/or motion sensor(s) are used to estimate or detect a one or more environmental conditions. In some circumstances, the activity level of the user can be more accurately determined by using the output of the one or more motion sensors with the output of the acoustic sensor. More specific examples are provided below with respect to FIGS. 7A-B.

Figure 3:
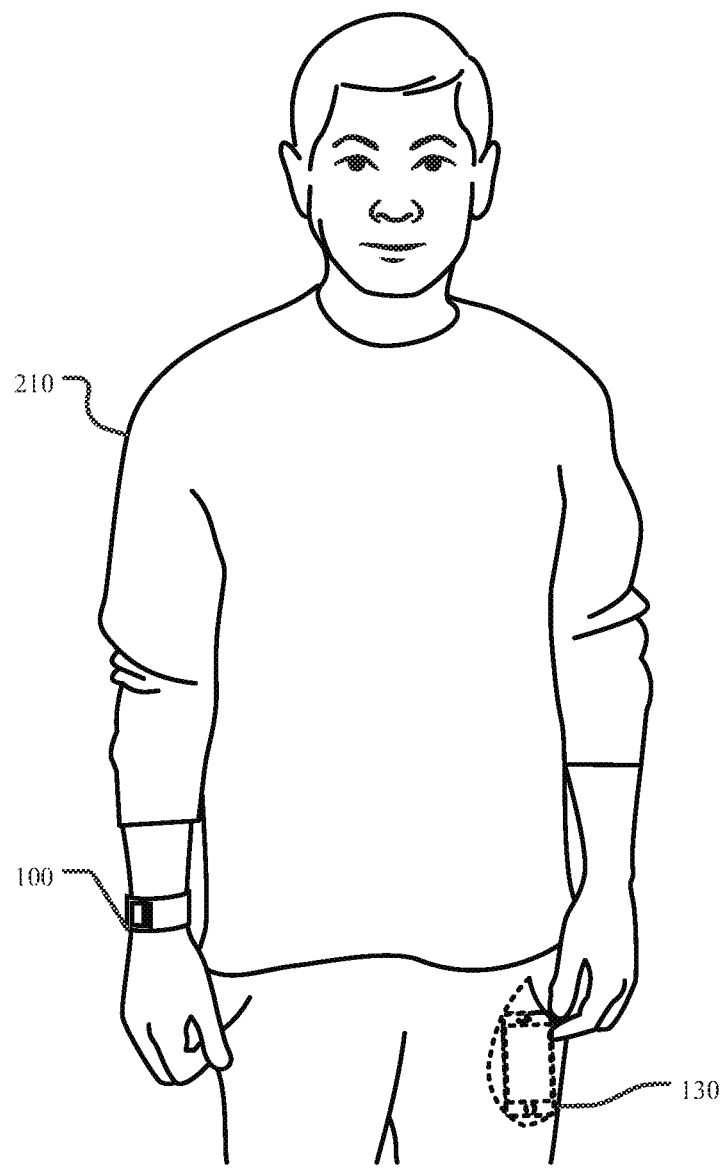
FIG. 3 depicts an example electronic device being worn and another example electronic device being carried by the user according to one or more embodiments of the present disclosure.

FIG. 3 depicts an example electronic device being worn and another example electronic device being carried by the user and subjected to one or more environmental conditions according to one or more embodiments of the present disclosure. In some embodiments, multiple devices 100, 130 are located proximate to the user 210 at the same time. As shown in FIG. 3, a wearable electronic device 100 and a mobile phone 130 are located proximate to the user. Additionally, a laptop computer, desktop computer, or other electronic device may be located in the near-immediate vicinity. In some implementations, one or more of the devices (100, 130) are be used to determine the environmental conditions surrounding the user 210. In some cases, if more than one devices are proximate to the user 210, the devices automatically pair by a Bluetooth or similar wireless communications protocol.

With respect to FIG. 3, the devices 100, 130 can be configured to communicate information related to the environmental conditions to each other to obtain a more accurate or more complete information about environmental conditions. For example, the motion sensor output the wearable device 100 can be used in combination with the motion sensor output of the other device 100 to compute or determine a more accurate estimate of the activity level of the user 210. Additionally, in some embodiments, the optical sensor output from each device 100, 130 is compared or combined to estimate an ambient lighting condition. For example, the relative difference between the optical sensors of the respective devices 100, 130 can be used to determine that the device 130 is located in the pocket of a user rather than in a dark room. Similarly, in some embodiments, the output from the acoustic sensors (e.g., microphones) of the respective devices 100, 130 are be combined and/or compared to determine a more accurate or complete estimation of ambient lighting conditions. In some implementations, an alert mode is selected based on environmental conditions detected by one or both devices that are in proximity to the user 210. In some cases, one output device is selected or designated to output an alert, thereby preventing multiple alerts being sent to the user 210 at or near the same time.

Additionally, with respect to FIG. 3, if there are multiple electronic devices proximate to or in the immediate vicinity of the user 210, it may be undesirable to output an alert on each device separately when an event is detect. Thus, in some cases, it may be advantageous to determine or identify a single device for outputting an alert. For example, the device that is most likely to be perceived by the user can, conditionally be selected or identified as the output device. Specific examples of this functionality are described below with respect to FIG. 7E.

Figure 4:
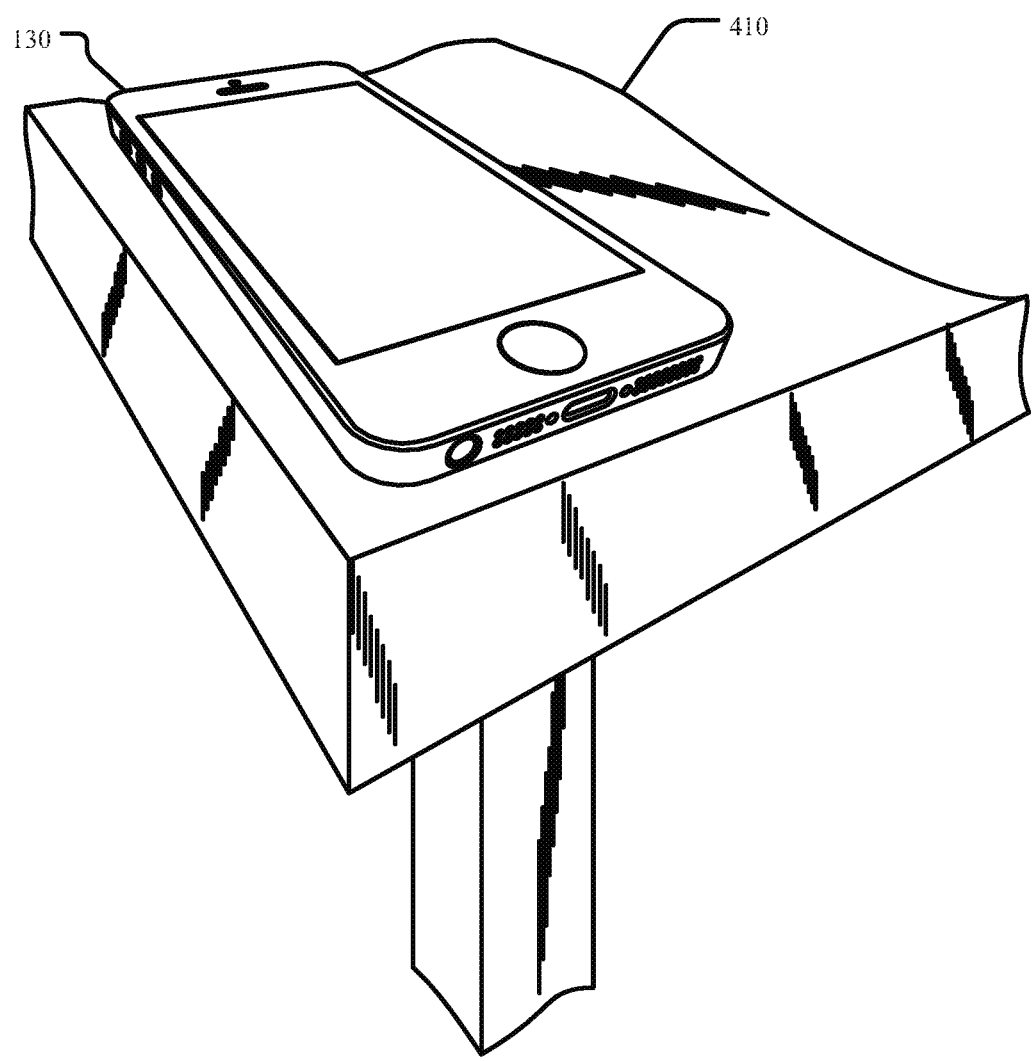
FIG. 4 depicts an example electronic device in an exemplary operating environment according to one or more embodiments of the present disclosure.

FIG. 4 depicts an example electronic device in an exemplary operating environment according to one or more embodiments of the present disclosure. As shown in FIG. 4, the device 130 is placed on a desk, table, or other surface when, for example, the device 130 is not in use. In some implementations, the one or more sensors are used to detect this scenario, which may correspond to a conditions where the user is not proximate to the device or may not readily perceive a stimulus or alert output by the device 130. In some embodiments, this scenario or environmental condition is detected using one or more motion sensors, which are used to determine a static activity level. The output from other sensors, including the microphone and the one or more optical sensors can, conditionally also be used to determine that the device 130 is subjected to a static activity level or environmental conditions consistent with a device that is not in use.

Figure 5:
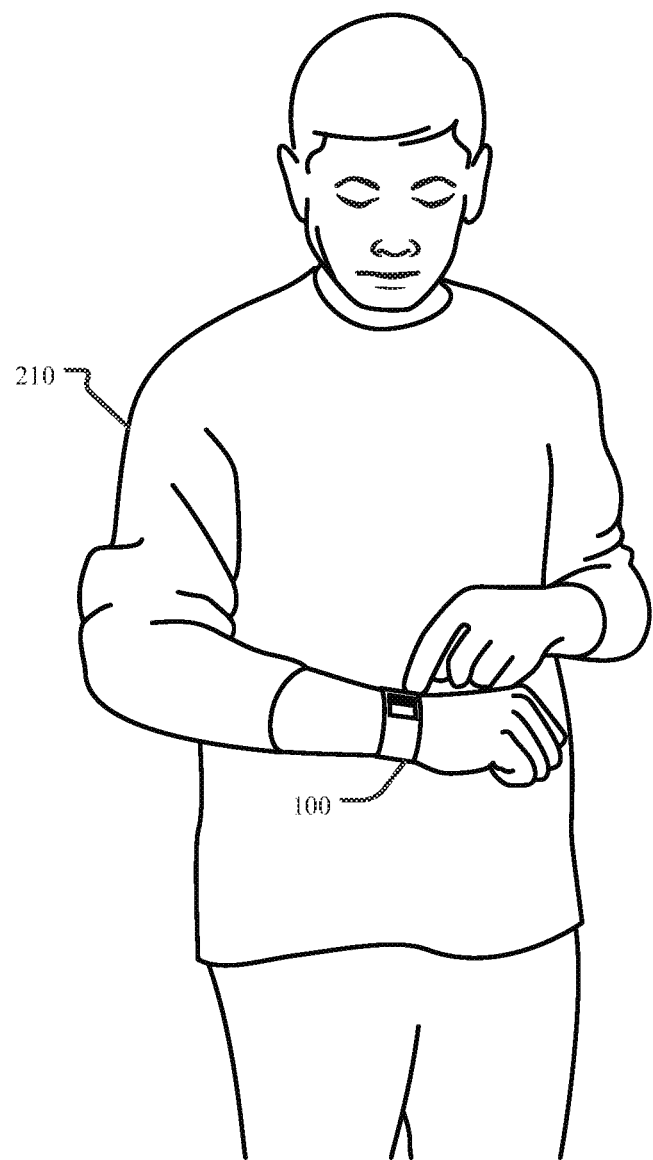
FIG. 5 depicts a user interacting with an example electronic device according to one or more embodiments of the present disclosure.

FIG. 5 depicts a user interacting with an example electronic device according to one or more embodiments of the present disclosure. As shown in FIG. 5, the user 210 may interact with the device by, for example, making a selection on a touch-sensitive surface of the device 100. In particular, the user may actively interact with the device by touching or pressing a touch-sensitive display of the device 100. In some cases, the device 100 is be able to sense that the user is looking at the display, and therefore, at least passively interacting with the device. Passive interaction may be detected, for example, using one or more optical sensors to detect the position and movement of the user's head. In some cases, the one or more optical sensors are configured to sense the location and movement of the user's eye, which may be consistent with the user 210 reading or watching the display of the device 100. A passive interaction may also be detected, for example, using one or more touch sensors that detect the user's hand position or grip on the device. In some cases, an active mode is selected which corresponds to a scenario or condition in which the user is either actively or passively interacting with the device. Additionally, in some cases, active or passive interaction from the user may be used to interrupt an escalating alert sequence and output modified alert sequence that is non-escalating or otherwise different.

Figure 6:
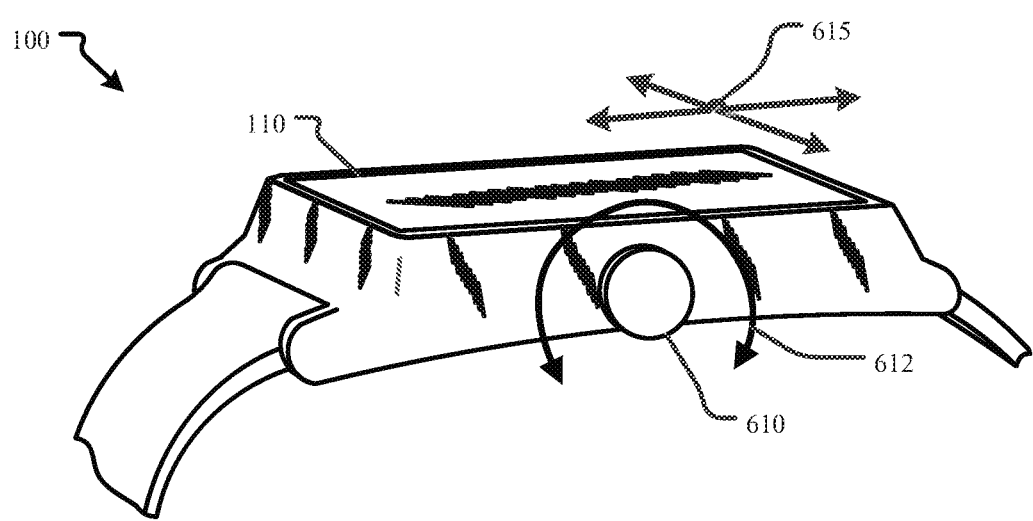
FIG. 6 depicts example user input to an electronic device according to one or more embodiments of the present disclosure.

FIG. 6 depicts example user input to an electronic device according to one or more embodiments of the present disclosure. As previously discussed, the device 100 can, optionally be configured to output a stimulus in response to a user input on a device. For example, as shown in FIG. 6, the user may provide touch input 615 on a touch display 110 or other touch-sensitive surface of the device. As shown in FIG. 6, a two-dimensional scrolling or panning input may be provided by moving the touch along one or more directions on the touch sensitive surface of the device. In some implementations, an audible audio output, such as a beep or click, is be produced as items or objects are indexed on the display 110 in response to the user input 615. In some implementations, a haptic output is coordinated with the audio output, such as a tap or bump. The audio and haptic output can, conditionally be synchronized.

Similarly, in some implementations, an audio and/or haptic output is produced in response to a rotational user input 612 provided using the crown 610 or knob. In some embodiments, the crown 610 is operatively coupled to a position sensor, such as an optical encoder, that is configured to produce an output signal that corresponds to the rotational input provided by the user. An example crown and position sensor are described in more detail below with respect to FIG. 12.

In some embodiments, an audible click and a haptic tap is output by the device for a predetermined amount of movement of the crown 610 or knob. For example, the device may, conditionally produce an output for every 5 degrees of movement of the crown 610. As explained in more detail below with respect to FIG. 7F, the output may be dependent, at least in part, on the speed or rate that the user input (615, 612) is provided. For example, if the speed of the user input (615, 612) exceeds a certain threshold, the device used to produce the haptic output may not be able to keep up. In particular, the response time of the haptic device may be higher than the time between haptic outputs. To help address this limitation, in some cases, the haptic output can be configurable to change from a synchronous output to an asynchronous output as the user input exceeds a certain threshold.

Specific example processes for producing an output using a device are described below with respect to FIGS. 7A-F. In accordance with the following examples, one or more of the devices described above with respect to FIGS. 1A-B can be used. Additionally, the device(s) can, optionally include internal components or elements consistent with FIGS. 8-9, described in more detail below. While certain processes and the device hardware implementations are provided by way of example, it is not intended that the description be limited to those example embodiments.

Figure 7A:
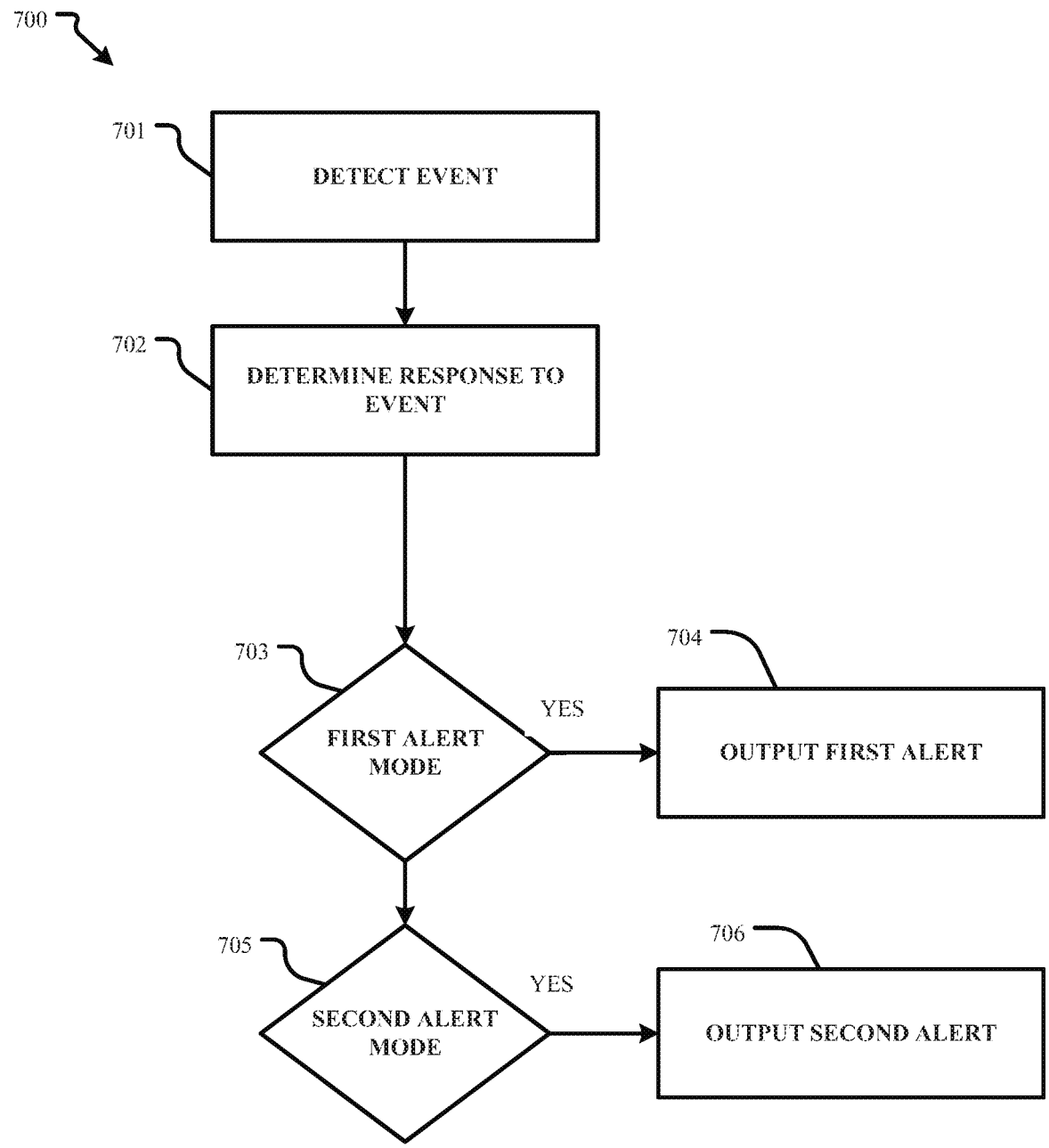
FIG. 7A depicts a process for determining a response to an event according to one or more embodiments of the present disclosure.

FIG. 7A illustrates an example process 700 determining a response to an event according to one or more embodiments of the present disclosure. As discussed above, it may be advantageous for a device to produce an output that corresponds to or has been adapted for one or more environmental conditions. In particular, a device can be configured to produce an alert or stimulus that is formulated to capture the attention of the user. However, the effectiveness of the alert may depend, in part, on one or more environmental conditions, which may change over time or user activity. Thus, it may be beneficial to detect the present state of one or more environmental conditions and select an output having a stimulus that corresponds to the detected environmental condition(s). The operations of process 700 may be performed using, for example, the example devices described above with respect to FIGS. 1A-B.

In operation 701, an event is detected by the device. In some implementations, the device detects the occurrence of an event by, for example, receiving a notification or a message related to the event. In some embodiments, the device receives a notification or message that the user has received an incoming e-mail message, text message, telephone call, voicemail message, and the like. In some implementations, the notification or message is received by an external device or service via a wired or wireless communication network. Alternatively, in some embodiments, an event is detected by, for example, receiving a notification or message from an application or program that is being executed on the device. For example, a clock alarm, clock timer, calendar scheduler, or similar program may trigger an event that is detected by the device. In other examples, an event is triggered in relation to a wide range of activities, including, satisfying personal health goal, reaching a geographic location, or meeting some other criteria or condition. In some implementations, when the device is a personal health device capable of one or more measuring physiological functions, an event corresponds to a physiological function exceeding a threshold or satisfying a condition. For example, an event can, conditionally be triggered in response to reaching a target heart rate, oxygenation level, or similar physiological condition.

In operation 702, a response to the event is determined. In some implementations, the response to the detected event is determined based on a current alert mode. In some embodiments, the current alert mode is selected based on one or more environmental conditions. In order to assure the relevancy of the selection, in some implementations, the one or more environmental conditions are detected concurrently with either the detection of the alert and/or the selection of the current alert mode. However, in some implementations, all of the environmental conditions are not present or occurring exactly when the detection and/or selection occurs.

With respect to operation 702, in some implementations, the current alert mode is selected from a set of three or more alert modes. As previously discussed, in some implementations, an alert includes multiple forms of stimuli, including, for example, audio, haptic, or visual components. In one embodiment, each of the three or more alert modes includes one or more of: an audio component, a haptic component, and a visual component. Additionally, the components (audio, haptic, visual) can, conditionally vary in intensity and in form depending on the alert mode.

In operations 703 and 704, in accordance with a determination that the current alert mode is a first alert mode, a first alert is output in response to the event. Similarly, in operations 705 and 706, in accordance with a determination that the current alert mode is a second alert mode, a second alert is output in response to the event. Furthermore, similar determinations can be made for as many alert modes that are defined or available for selection. As previously mentioned, each of the alert modes may vary with respect to each other in some aspect. For example, the components that are used (e.g., audio, haptic, visual) may vary, as well as the intensity and the form of each component for each alert mode.

In some implementations, the alert mode is automatically selected based on the one more environmental conditions that are detected by the device. In some cases, the current alert mode is selected prior to detecting the occurrence of the event. For example, the relevancy of the alert mode may be checked and the current alert mode may be selected or confirmed according to a regularly repeating interval. Additionally, in some implementations, the current alert mode is selected or confirmed at or near the same time that the event occurs. For example, the occurrence of an event can be used to trigger the selection of the current alert mode.

In some implementations, environmental conditions relate to the physical environment that in which the device is being operated in or conditions that the device is subjected. Environmental conditions that are used to select the current alert mode can include, without limitation, acoustic noise, user activity, device motion, device orientation ambient light, and others. Environmental conditions generally do not include specific alert setting established by a user, such as quiet hours or a silent mode. Additionally, environmental conditions may not, in some cases, include the geographic location of the device.

In some embodiments, the environmental conditions are monitored and detected using one or more of the sensors associated with the device. Example environmental sensors include, without limitation, accelerometers, gyroscopes, tilt sensors, microphones, light sensors, image sensors, proximity sensors, and the like. Example environmental sensors are described above with respect to FIGS. 1A-B, above, and FIGS. 8-10, below. It is not necessary that each of the sensors be located on the device. As mentioned previously with respect to FIG. 3, multiple devices that are located in the same vicinity or proximate to each other can be configured to share sensor data via a data link or other communication scheme.

With respect to each of the following examples, one or more environmental sensors can be configured to detect particular environmental conditions, and the output of those sensors used to select an alert mode having elements or components that correspond to the detected conditions. In some cases, the environmental sensors are used to compute a changed or changing environmental condition and automatically provide for different alert outputs for the same type of event.

In some embodiments embodiment, the environmental sensor is a microphone that is configured to detect ambient acoustic conditions. The microphone may can, optionally be integrated with the device and configured to record audio signals or input over a sample time period. In some implementations, the collected audio data is stored and further analyzed to compute or determine an ambient acoustic level. In some embodiments, the collected audio data is filtered and processed to remove audio input that may correlate to the user's voice. The audio data can, optionally also be processed to determine an average or representative acoustic level over a given period of time. In some instances, the audio data from multiple sample time periods are used to compute or determine the acoustic level.

In some embodiments, the acoustic level is used to select an appropriate alert mode as the current alert mode, in accordance with operation 702. In one embodiment, the alert mode that is selected includes an audio component that corresponds to the acoustic level determined using the environmental sensors. For example, if the acoustic level represents a loud or noisy ambient acoustic environmental condition, a first alert mode can, conditionally be selected as the current alert mode, the first alert mode having an audio component with an elevated volume or intensity (as compared to other alert modes). Similarly, if the acoustic level represents a condition that is less loud or noisy, a second alert mode can, conditionally be selected as the current alert mode, the second alert mode having an audio component with a volume or intensity that is reduced with respect the audio component of the first alert mode. Additional alert modes may be similarly defined and selected according to an audio component that may correspond to a detected ambient acoustic noise level.

In some implementations, the current alert mode includes or defines another component that corresponds to the detected acoustic level. In some embodiments, a third alert mode is selected as the current alert mode, the third alert mode having an haptic component that corresponds to the acoustic noise level. For example, the intensity or energy of the haptic output may be stronger in accordance with a loud or noisy acoustic level. Similarly, a haptic output may have and intensity or energy that is weaker or reduced in accordance with a quiet or less noisy acoustic level. In some implementations, an alert mode is selected as having a visual component that corresponds to the detected acoustic level. For example, the alert mode may include a visual component, such as a beacon or strobe having an intensity or frequency that corresponds to the detected acoustic level. In some instances, one or more components (audio, haptic, visual) are used in conjunction with another component to produce an appropriate level of stimulation to the user, depending on the environmental conditions.

In one example, a user is wearing a wearable electronic device, in accordance with the embodiments described above with respect to FIG. 1A. In one scenario, the user and the device are subjected to a noisy environment, such as a gymnasium or workout room. In accordance with some embodiments, the device detects the noisy environmental condition using the microphone, which is used to determine or compute an ambient sound level. In response to a high-ambient sound level, the device selects an alert mode having an audio component having an increased volume (example audio component) that corresponds to the high-ambient sound level. Additionally or alternatively, in some implementations the device selects an alert mode having an increased haptic vibration (example haptic component and/ or visual strobe (example visual component). The device then outputs an alert in accordance with the selected alert mode.

In some embodiments, the environmental sensor includes one or more motion sensors that are configured to detect device motion and/or user activity. The one or more motion sensors can, optionally be integrated or associated with the device and may be configured to record motion and/or activity over a sample time period. Example motion sensors include, for example, an accelerometer, gyroscope, tilt sensor, and the like, as discussed above with respect to FIGS. 1A-B. In some implementations, the collected motion data is stored and further analyzed to compute or determine an activity level. In some embodiments, the collected motion data is filtered and processed to determine discrete number or movements (translational or rotational) over a given period of time. In some cases, the number of movements is used to compute or determine an activity level. Additionally or alternatively, the intensity of the movements over a period of time is used to compute or determine an activity level.

In some cases, the activity level corresponds to or represents the activity of the user. Thus, a high activity level may represent an environmental condition in which the user may be exercising or moving rapidly. Similarly, a low activity level may represent an environmental condition in which the user is at rest or sedentary.

In some embodiments, the activity level is used to select an appropriate alert mode as the current alert mode, in accordance with operation 702. In one embodiment, the alert mode that is selected includes an audio component that corresponds to the activity level determined using the environmental sensors. For example, if the activity level represents a highly active environmental condition, a first alert mode may be selected as the current alert mode, the first alert mode having an audio component with an elevated volume or intensity (as compared to other alert modes). Similarly, if the activity level represents a condition that less active, a second alert mode may be selected as the current alert mode, the second alert mode having an audio component with a volume or intensity that is reduced with respect the audio component of the first alert mode. Additional alert modes may be similarly defined and selected according to an audio component that may correspond to a detected activity level. As in the previous example, the alert mode that is selected may have other components (e.g., haptic, visual) that also correspond to the detected activity level.

In some embodiments, the environmental sensor includes one or more optical sensors that are configured to detect optical or lighting environmental conditions. The one or more optical sensors can, optionally be integrated with the device and configured to record light quantity or lighting conditions over a sample time period. Example optical sensors include, for example, an ALS, an image sensor, a proximity sensor, and the like, as discussed above with respect to FIGS. 1A-B. In some implementation, the collected optical data is stored and further analyzed to compute or determine an ambient light level. In some embodiments, the collected optical data is filtered and processed to determine an average amount of light over a given period of time, which can, conditionally be used to compute or determine ambient light level. Additionally or alternatively, the intensity of light received over a period of time can be used to compute or determine a light level.

In some cases, the light level corresponds to or represents the setting in which the device is being operated. For example, bright or a high light level may represent an outdoor or public operating environment. In some cases, bright environmental conditions indicate that an alert may be more intense because the user is outdoors. Conversely, a low or dim light level may correspond to or represent an environmental condition in which the user is indoors or more private operating environment. For example, a low light level may correspond to a user being located in a movie theater or presentation. In some cases, a low light level may indicate that an alert should be less intense to avoid disrupting indoor activities.

In some embodiments, the light level is used to select an appropriate alert mode as the current alert mode, in accordance with operation 702. In one embodiment, the alert mode that is selected includes an audio component that corresponds to the light level determined using the environmental sensors. For example, if the light level represents a brightly lit environmental condition, a first alert mode is selected as the current alert mode, the first alert mode having an audio component with an elevated volume or intensity (as compared to other alert modes). Similarly, if the lighting level represents a condition that less bright, a second alert mode is selected as the current alert mode, the second alert mode having an audio component with a volume or intensity that is reduced with respect the audio component of the first alert mode. Additional alert modes can, conditionally be similarly defined and/or selected according to an audio component that may correspond to a detected activity level. As in the previous examples, the alert mode that is selected can, optionally have other components (e.g., haptic, visual) that also correspond to the detected light level.

In some embodiments, the environmental sensor includes a battery power sensor that is configured to detect a current battery level. In some implementations, the battery power sensor includes a circuit integrated into the device that is configured to measure an electrical property of the battery (e.g., voltage, current, impedance) that may be indicative of the remaining battery power. Similar to the examples provided above, an alert mode can, conditionally be selected as the current alert mode based on a correspondence between the battery power level and one of the components (audio, haptic, visual) of the alert.

In one specific example, based on the current battery level, the alert mode is selected based on the power that may be consumed during an alert output. For example, if the battery level is low (e.g., 5%, 10%, or 15% of total battery power), an alert mode is selected that uses less power as compared to some other alert modes. One technique may be to eliminate or reduce the intensity of alert components that consume a large amount of energy. In some implementations, an alert mode having no haptic component is be selected based on a low battery level. Additionally or alternatively, the output of the components is staggered or delayed in some alert modes in order to reduce peak power usage.

In accordance with each of the examples provided above, the alert mode that is selected can, optionally include a variety of component combinations. In various alert modes, a component can, optionally be eliminated. For example, a first alert mode includes a first haptic component and a first visual component. A second alert mode includes a second haptic component and no visual component. Additionally, one or both of the components can, conditionally vary depending on the alert mode. In some embodiments, a first alert mode includes a first audio component and a first haptic component, and a second alert mode includes a second audio component and second haptic component, where the first audio and first haptic component are different than the second audio component and the second haptic component, respectively. Additionally, in some implementations, an alert mode only includes a visual component. For example, a first alert mode includes no audio component and no haptic component, and only includes only a visual component such as a notification displayed on a display of the device.

Additionally, as previously discussed, in some implementations an alert mode includes two or more components that are staggered or offset by a delay. In some embodiments, a first alert mode includes a first audio component and a first haptic component offset by a first delay. A second alert mode includes the first audio component and the first haptic component, but offset by a second delay that is different than the first delay. The difference in delay between the alert modes may depend, in part, on the likelihood that the user will be able to perceive a haptic output given certain environmental conditions. In some implementations, the delay between components is increased based on the likelihood that the user is distracted or already receiving a high level of stimulation. In some implementations, the delay between alert components is increased if the activity level and/or ambient acoustic levels are high. In particular, a haptic component can, conditionally proceed an acoustic component by a short offset. In some implementations, the haptic component provides a priming stimulus that may increase the likelihood that the audio stimulus will be perceived by the user.

Figure 7B:
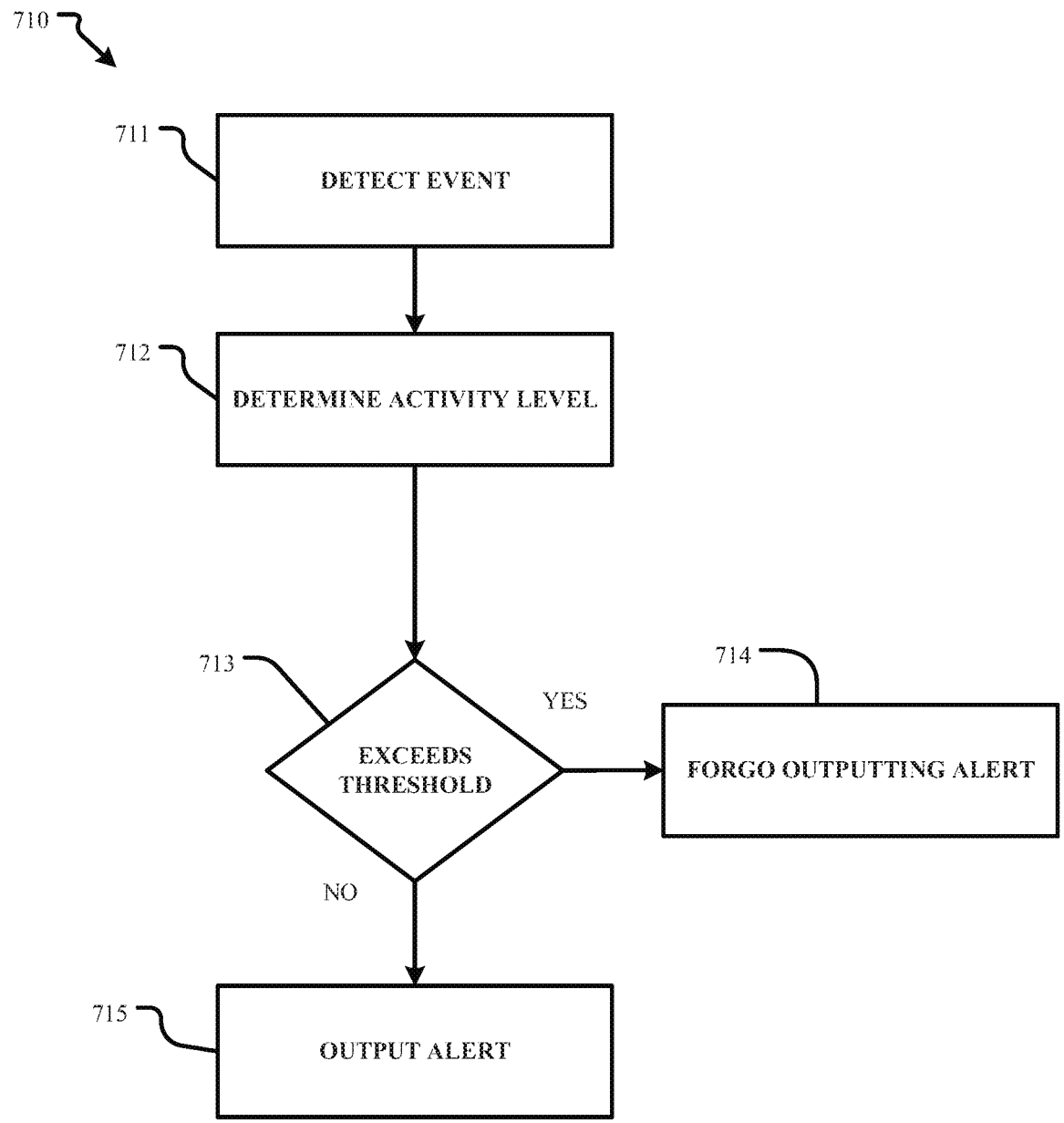
FIG. 7B depicts a process for determining whether or not to respond to an event based on user activity according to one or more embodiments of the present disclosure.

FIG. 7B depicts a process 710 for determining whether or not to respond to an event based on user activity according to one or more embodiments of the present disclosure. When a level of user activity is high, it may be difficult for a user to perceive an alert associated with an event. Additionally, even when an alert is perceived by a user engaged in heavy activity, the user may not be as likely to respond to the alert until the activity is complete. Thus, in some implementations, it may be advantageous to delay or forgo the output of an alert until the user has completed an activity or is at rest. The operations of process 710 may be performed using, for example, the example devices described above with respect to FIGS. 1A-B.

In operation 711, an event is detected by the device. In some implementations, the device detects the occurrence of an event by, for example, receiving a notification or a message related to the event. As in the previous example operation 701, in some implementations, the device receives a notification or message that the user has received an incoming e-mail message, text message, telephone call, voicemail message, and the like. In some implementations, an event is detected by, for example, receiving a notification or message from an application or program that is being executed on the device. As in the example provided above, an event can, conditionally be triggered in relation to a wide range of activities or functions, including, satisfying personal health goal, reaching a geographic location, reaching a target heart rate, reaching an oxygenation level, or satisfaction of other criteria.

In operation 712, an activity level is determined. In some implementations, one or more sensors is used to detect the motion of the device, which is used to determine an activity level. Similar to the example provided above with respect to FIG. 7A, one or more motion sensors can, optionally be integrated into or associated with the device and may be configured to record motion and/or activity over a sample time period. Example motion sensors include, for example, an accelerometer, gyroscope, tilt sensor, and the like, as discussed above with respect to FIGS. 1A-B. In some implementations, the collected motion data is stored and further analyzed to compute or determine an activity level.

In some embodiments, the collected motion data is filtered and processed to determine discrete number or movements (translational or rotational) over a given period of time. In some cases, the number of movements is used to compute or determine an activity level. Additionally or alternatively, the intensity of the movements over a period of time is used to compute or determine an activity level. As discussed in the earlier example, the activity level may correspond to or represent the activity of the user. Thus, a high activity level may represent an environmental condition in which the user may be exercising or moving rapidly. Similarly, a low activity level may represent an environmental condition in which the user is at rest or sedentary.

In operation, 713, a determination is made with regard to the activity level exceeding a threshold. The threshold may correspond to the method used to determine the activity level in operation 712. For example, if the activity level is based on the number of motion events over a period of time, the threshold may similarly represent a threshold number of motion events over a similar period of time. If the activity level is based in part, on the intensity of the activity, the threshold may also represent a threshold level that is based, at least in part, on the intensity of the activity. In some cases, the threshold is customized based on an average level of user activity or device motion. For example, if a user is more active, then the threshold can, optionally be set higher than a user that is less active.

In operation 714, in accordance with a determination that an activity level exceeds a threshold, the outputting of an alert is forgone or delayed. In some implementations, if the activity level is high, the output of an alert is delayed until a later time when the activity level may be lower. For example, the activity level can, optionally be periodically determined or checked over a predetermined time period. In some instances, the output of the alert is further delayed or forgone as long as the activity level exceeds a low-activity threshold, which can, optionally be the same or different than the original threshold.

In operation 715, in accordance with a determination that the activity level does not exceed the threshold, the alert is output. In some implementations, the output is provided in accordance with one or more of the other examples provided herein. For example, the alert that is provided can, optionally include one or more alert components (audio, haptic, visual) that correspond to the environmental conditions associated with the device. Additionally, the alert that is output can, optionally be a fixed alert that is not dependent on one or more environmental conditions.

In some cases, the output of the alert is forgone or delayed until a subsequent criteria is satisfied. As previously mentioned, in some implementations, the output is forgone or delayed until the activity level drops below a low-activity threshold, which can, optionally be the same or different than the original threshold. Additionally, in some implementations, the output is forgone or delayed until a predetermined time period has passed since the first time the output of the alert was forgone. For example, the device can be configured to wait until an activity level drops below a threshold, and if the level does not drop over the predetermined period of time, the alert is output anyway.

In some embodiments, if multiple alert outputs that are associated with multiple events have been forgone due to a high activity level, the alerts are combined into a single alert when a determination is eventually made to output an alert. For example, if multiple events occur during a period of high activity, the user will be notified by a single (combined) alert that represents all of the alerts that were forgone during the period of high activity.

One example implementation of process 710 includes user activity associated with an exercise or workout routine. In this scenario, the device receives or detects one or more events associated with one or more physiological conditions while the user is performing an exercise. When the user is at rest, due to a break between exercise sets or when the workout is complete, the device, in some implementations, automatically detects the reduced activity and outputs the one or more alerts associated with the events that occurred during the exercise. In another example, one or more alerts are delayed or forgone while a user is typing or performing another activity that introduces high-frequency movement near the device. The delayed or forgone alert output may increase the user's perception of, for example, a haptic component output that may be masked by the high-frequency movement. In another example, decision to forgo the alert is also based on other environmental conditions. For example, the output of an alert, in some implementations, is forgone or delayed while a user is walking in a busy or loud environment. When the user stops walking, at for example, a traffic light, the device automatically outputs the previously forgone alert.

Figure 7C:
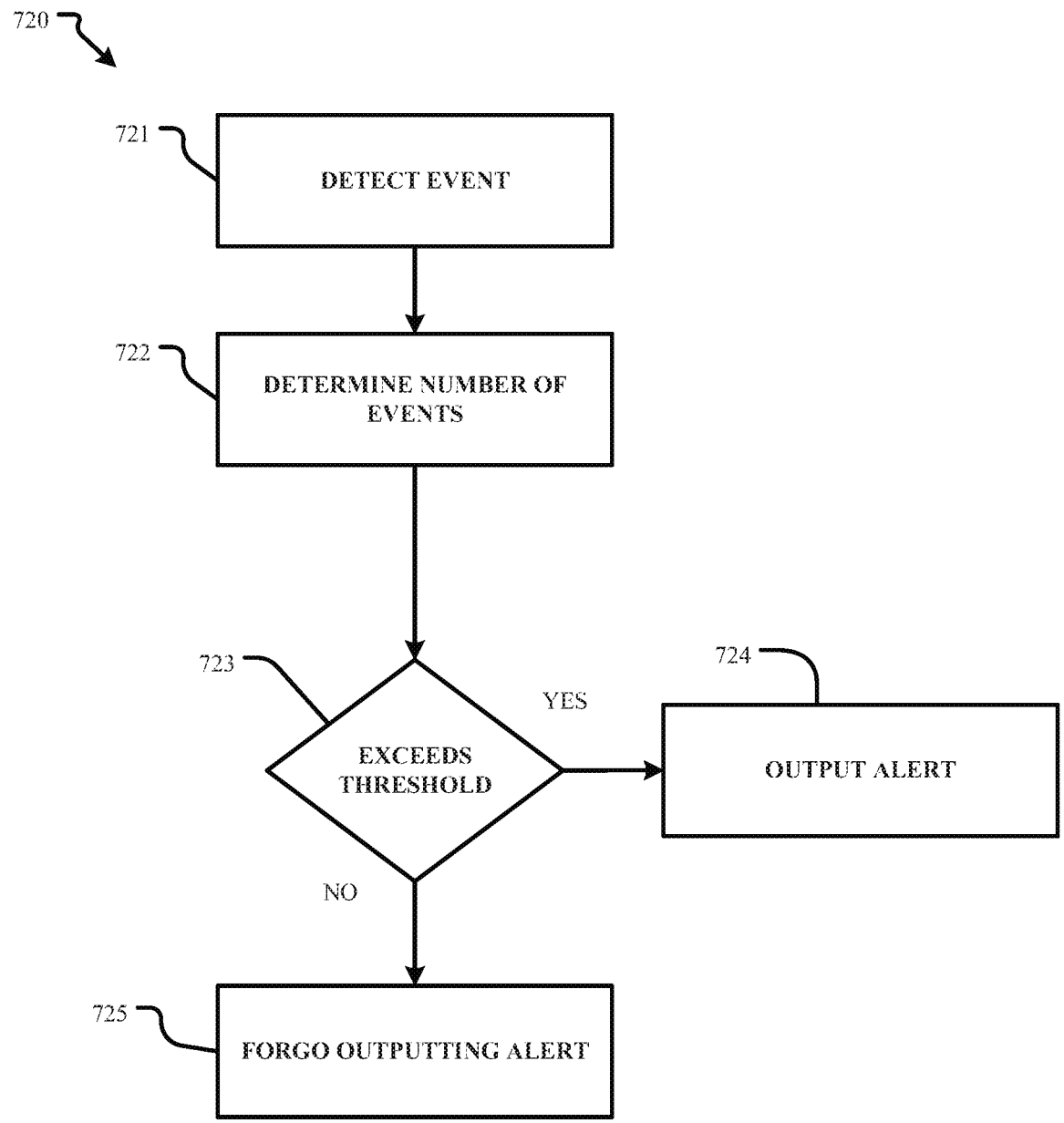
FIG. 7C depicts a process for determining whether or not to respond to an event based on a number of events according to one or more embodiments of the present disclosure.

FIG. 7C depicts a process 720 for determining whether or not to respond to an event based on a number of events according to one or more embodiments of the present disclosure. In some cases, it may be advantageous to group or batch together multiple alerts that are associated with multiple events may be related or that may occur over a short period of time. In some embodiments, a series of closely occurring events may result in a single, batched alert instead of triggering a series of individual alerts for each event. A combined or batched alert may be useful, for example, when a large number of event occur over a period of time, or when the time between events is very small. In another example, it may be determined that two or more events may be related and, thus only a single alert is warranted. In these cases, producing a single alert may be more effective in capturing the user's attention and may prevent alert fatigue, as discussed previously. The operations of process 720 may be performed using, for example, the example devices described above with respect to FIGS. 1A-B.

In operation 721, an event is detected. In some implementations, the device detects the occurrence of an event by, for example, receiving a notification or a message related to the event or receiving a notification or message from an application or program that is being executed on the device. As in the previous examples, in some implementations, the device receives a notification or message that the user has received an incoming e-mail message, text message, telephone call, voicemail message, and the like. As in the examples provided above, an event can, conditionally be triggered in relation to a wide range of activities or functions, including, satisfying personal health goal, reaching a geographic location, reaching a target heart rate, reaching an oxygenation level, or satisfaction of other criteria.

In operation 722, the number of events is determined. In some embodiments, the device is configured to wait a predetermined period of time after detecting an event. In some implementations, the number of events (requiring an alert output) that occur over the predetermined amount of time are be used to compute the number of events for operation 722. In some implementations, the device is configured to detect and count the number of events received over a predetermined, regularly repeating time period. Thus, in some cases, the number of events includes one or more events that occurred prior to the event detected in operation 721. A variety of other techniques can, optionally be used to determine the number of events that are received by the device over a period of time.

With regard to operation 722, in some implementations, the number of events that are determined depends on the type of event that occurred, a person associated with the event, and/or the content associated with the event. For example, in some implementations only text messages are counted pursuant to operation 722. Similarly, in some implementations, only events associated with communications (e.g., e-mail, text messages, telephone calls) are counted pursuant to operation 722. Additionally or alternatively, in some implementations, only events that are associated with the same sender or group of senders are counted for operation 722. Similarly, in some implementations, events that share similar content or subject matter are counted for operation 722.

In operation 723, a determination is made whether the number of events exceeds a threshold. In some instances, the threshold is a fixed threshold that is determined by the device or device settings. In some instances, the threshold is configurable by the user. In operation 725, in accordance with a determination that the number of events that have been detected over the predetermined period does not exceed the threshold, the output of the alert is forgone.

In operation 724, in accordance with a determination that a number of events that have been detected over a predetermined period exceeds a threshold, an alert is output. In some cases, if a previous alert associated with a previous event has been forgone, the alert that is output is based, at least in part, on the previously occurring event. In some cases, the alert includes information indicative of the event and one or more prior events occurring prior to the event. In some implementations, the alert includes a visual component that includes, a list of the subject lines or senders for one or more e-mail messages that were received during the predefined time period.

With respect to operation 724, in some implementations, the alert includes an indication of the number of events that have been batched or combined in the alert output. In some implementations, the strength of the alert (e.g., intensity of the audio or haptic component) is based on the number of events that have forgone alerts. For example, the more events that have been combined into a single alert may result in a more prolonged or intense alert output. Additionally, in some implementations, the strength of the alert output is based, in part, on the frequency and/or type of events that have had an alert forgone.

In some embodiments of process 720, events of different types are batched together. For example, if the threshold is 3 messages in 2 minutes, receiving an email, an SMS message and a phone call within 2 minutes will trigger an alert. In some embodiments, events of different types of events are batched together. For example, if the threshold is 3 messages in 2 minutes, receiving an email, an SMS message and a phone call within 2 minutes will not trigger an alert, while receiving 3 emails within 2 minutes will trigger an alert. In accordance with the description of process 720, a variety of events and criteria may be counted and used to forgo and/or eventually output an alert.

Figure 7D:
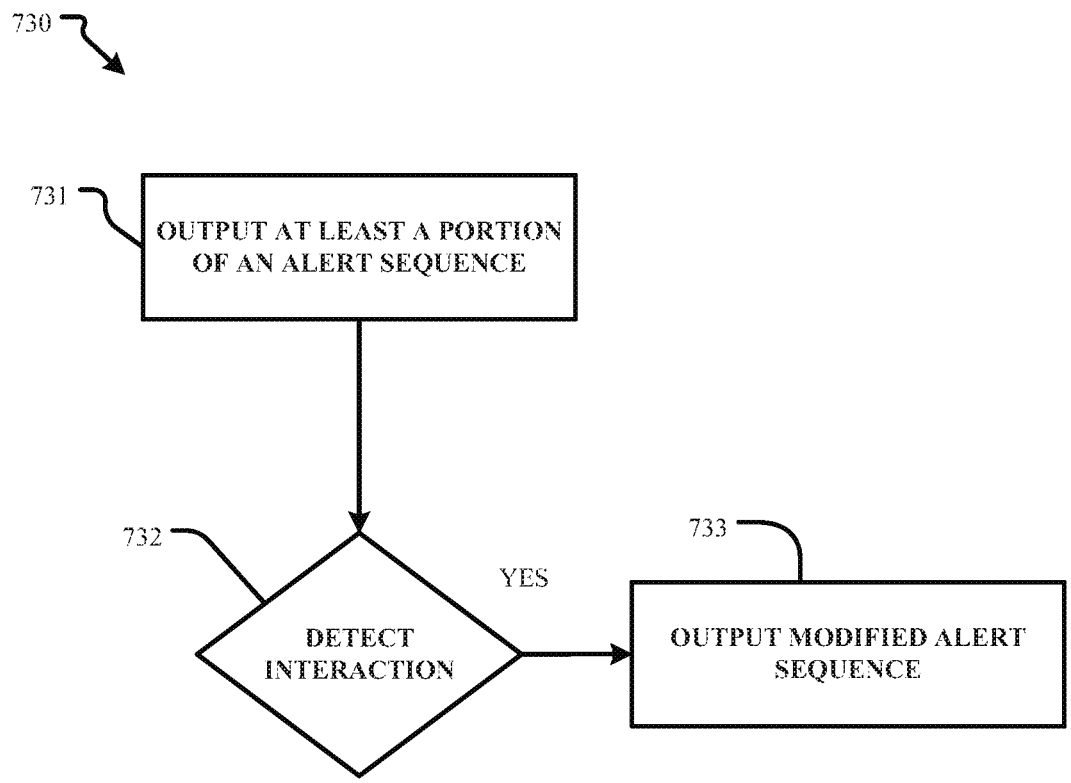
FIG. 7D depicts a process for outputting a modified alert sequence according to one or more embodiments of the present disclosure.

FIG. 7D depicts a process 730 for outputting a modified alert sequence according to one or more embodiments of the present disclosure. In some implementations, an alert is configured to escalate by producing a stimulus or output that increases in intensity over time. In some cases, the escalation sequence or progression of the alert is interrupted and modified as a result of a user interaction with the device. In some cases, an interaction from the user may indicate that the user's attention is already focused on the device and that further escalation of the alert sequence may not be necessary. In some embodiments, an escalating alert sequence is output by the device until receiving an input or an interaction from the user. In some embodiments, the device detects passive interaction, such detecting or estimating when a user is reading content on the display. The operations of process 730 may be performed using, for example, the example devices described above with respect to FIGS. 1A-B.

In operation 731, a portion of an alert sequence is output using the device. In some cases, the alert sequence includes predetermined sequence of alert outputs that escalate in intensity over time. In some embodiments, each of the alert outputs includes one or more alert components (audio, haptic, visual) that increase in intensity over time. Additionally or alternatively, in some implementations, the alert escalates by adding components to subsequent outputs to increase the overall intensity of the alert. In some embodiments, a first output includes only a haptic component, a second output includes a haptic and audio component, and a third or subsequent output includes a haptic, audio, and visual component.

With regard to operation 731, in some implementations, the alert sequence corresponds to the occurrence of a single event. In some implementations, the alert sequence corresponds to the receipt of a message or other communication. The alert sequence can, optionally also correspond to an upcoming calendar event, a timing notification, or other type of reminder. The alert sequence can, optionally also correspond to a series of activity monitor alerts that provide feedback with regard to the progress of the user toward meeting a fitness goal, such as completing a workout routine.

In operation 732, an interaction with the user is detected. In order to affect the alert, the interaction with the user is, optionally detected while the portion of the alert sequence is being output. As mentioned previously, the interaction with the user may include an active and/or passive interaction. In some implementations, a user interaction indicates that the user is already be paying attention to the device and may not need or want an alert to continue to escalate. In some implementations, a user interaction is interpreted as a request to modify the alert sequence to either increase or decrease the intrusiveness of the alert.

With reference to FIG. 5, the user 210 may actively interact with the device by, for example, contacting a touch-sensitive surface of the device 100. In particular, the user may actively interact with the device by selecting an item displayed on a touch-sensitive display of the device 100. The user 210 may also actively interact with the device by pressing a button, turning a knob, or by providing some other form of user input. In some embodiments, the user may speak a voice command, which may detected by the microphone of the device and interpreted as user input.

Additionally or alternatively, in some implementations, the device is configured to detect passive interaction with the user. With reference again to FIG. 5, the device 100 can be configured to use one or more sensors to determine or estimate if the user is looking at the display, and therefore, at least passively interacting with the device. In some implementations, passive interaction is detected, for example, using one or more optical sensors to detect the position and movement of the user's head. In some cases, the one or more optical sensors are configured to sense the location and movement of the user's eye, which may be consistent with the user 210 reading or viewing the display of the device 100. In some implementations, the device is configured to detect the user's grip on the device, which may also indicate that the user is currently viewing or interacting with the device.

Returning to FIG. 7D, in operation 733, a modified alert sequence is selected and output in response to the interaction with the user. In particular, in some implementations, the original alert sequence output in operation 731 is paused or terminated and a new, modified alert sequence is output instead. In some cases, the modified alert sequence is a continuation of the original alert sequence, but is modified in intensity or intrusiveness. For example, if the original alert sequence includes a series of 10 outputs and the user interaction is detected on the 6th output, the modified alert sequence includes 4 outputs, which replace the 4 remaining outputs of the original series of 10.

With regard to operation 733, in some implementations, the modified alert sequence is a non-escalating alert sequence. In some instances, the modified alert sequence includes a series of outputs that do not increase in intensity over time. In some cases, the modified alert sequence includes a series of outputs that decrease in intensity over time. In some instances, the modified alert sequence is a silent alert sequence. In some instances, the modified alert sequence produces only a visual component in response to the interaction with the user.

In some embodiments, process 730 is used to increase or decrease the intrusiveness of an alert sequence. In some implementations, the user interaction of operation 732 includes an input that is a request to reduce the intrusiveness of the portion of the alert sequence output in operation 731. In some implementations, the request to reduce the intrusiveness is input via the touch-sensitive display of the device and results in the output of a modified alert sequence that is less intrusive. In some instances, a less intrusive output includes an output having an audio component that is reduced in volume and/or a haptic component having a shorter or lower energy output. In some implementations, the user interaction of operation 732 includes an input that is a request to increase the intrusiveness of the portion of the alert sequence output in operation 731. In some instances, a user input results in a modified alert sequence having an increased intrusiveness. An output having an increased level of intrusiveness can, optionally include, for example, an audio component having increased volume and/or a haptic component having an increased duration or energy output.

In one example, a user receives an alert sequence triggered by an event associated with the user meeting a health-related goal. For example, the alert sequence may be produced in response to the user reaching a target heart rate, as detected by a heart-rate monitor. In some instances, the alert sequence escalates or increases in intensity until the user interacts with the device by, for example, shaking the device, which is perceived by one or more motion sensors integrated with the device. Additionally or alternatively, the user interacts with the device by touching the touch screen, pushing a button, or turning a knob. In response to the user interaction, the alert sequence is interrupted and a modified alert sequence is output. In some implementations, the modified alert sequence is a non-escalating sequence, such as a sequence of audio beeps. In some implementations, the modified alert sequence continues as long as the user maintains the target heart rate or another event triggers another alert.

Figure 7E:
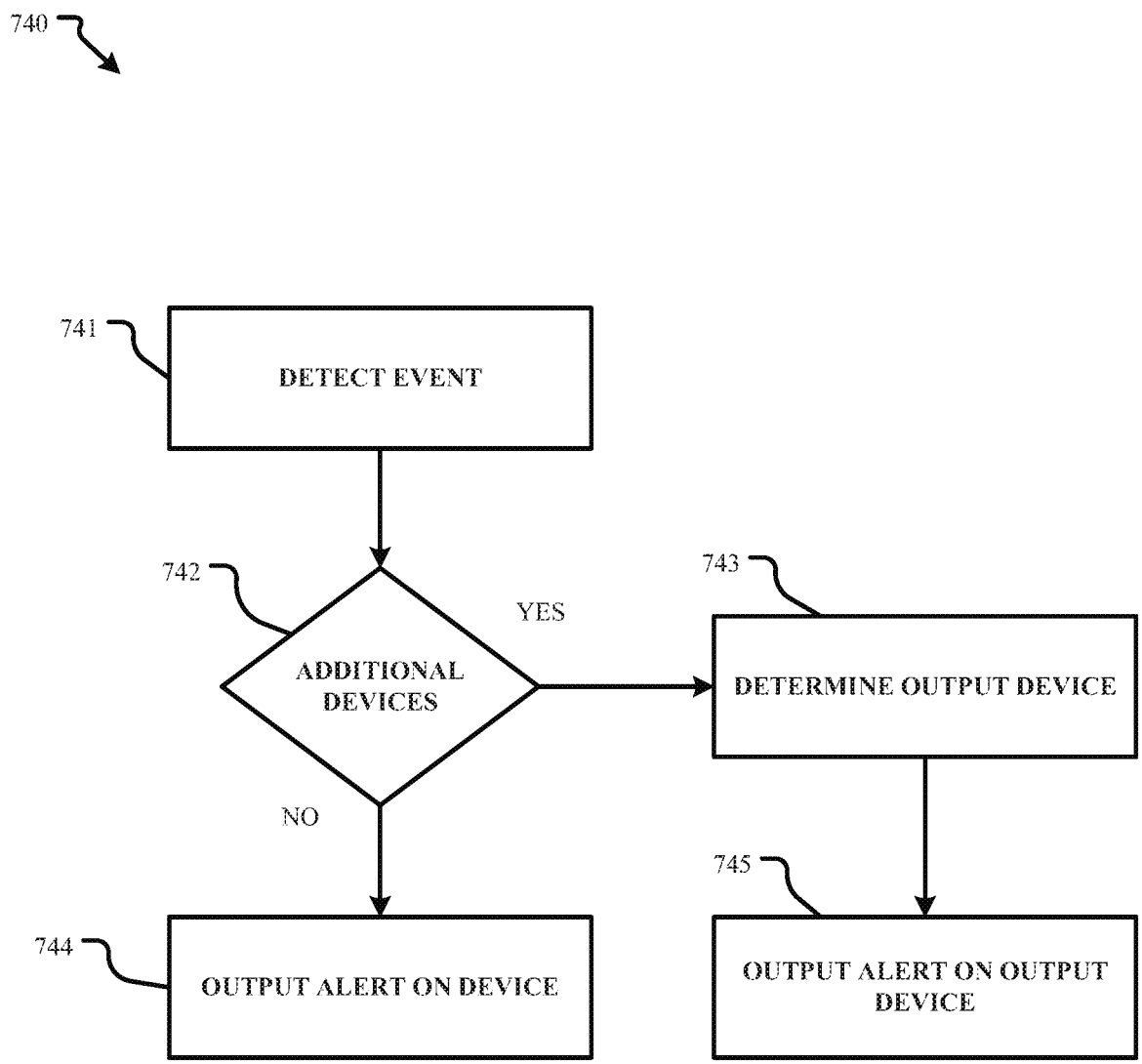
FIG. 7E depicts a process for determining an output device according to one or more embodiments of the present disclosure.

FIG. 7E depicts a process 740 for determining an output device according to one or more embodiments of the present disclosure. In some scenarios, multiple devices are proximate to a user when an event is detected. It may be undesirable for each of the devices to output an alert in response to the same event. Thus, in some cases, it may be advantageous to select one device to output the alert. The operations of process 740 may be performed using, for example, the example devices described above with respect to FIGS. 1A-B and 3.

In operation 741, an event is detected. In some implementations, the device detects the occurrence of an event by, for example, receiving a notification or a message related to the event or receiving a notification or message from an application or program that is being executed on the device. As in the previous examples, in some implementations, the device receives a notification or message that the user has received an incoming e-mail message, text message, telephone call, voicemail message, and the like. As in the examples provided above, an event can, optionally be triggered in relation to a wide range of activities or functions, including, satisfying personal health goal, reaching a geographic location, reaching a target heart rate, reaching an oxygenation level, or satisfaction of other criteria.

In operation 742, a determination that a second device is in proximity to the first device is made. In some cases, the determination is made in response to detecting the event. In one embodiment, the first device is a wearable electronic device 100 and the second device is a mobile telephone 130, as depicted in FIG. 3. In some embodiments, one or more of another type of device, such as a notebook computer, a desktop computer, a tablet device, a personal media player device, a television device, or the like are in proximity to the user. In some implementations, a third device, a fourth device, and other additional devices are also detected in accordance with operation 742.

With regard to operation 742, in some implementations, a second device (or other additional device) are detected using, for example, a wireless communication signal or beacon. In some embodiments, the first and second device have been previously paired using, for example, a Bluetooth communication scheme. In some cases, the second device (or other additional device) is detected using an automatic detect and connect process as part of the Bluetooth connection routine. In some implementations, the second device is detected using a beacon or intermittent broadcast signal that is transmitted from the first device. In some implementations, the second device is detected as being connected to a common wireless communication node. For example, the second device can, selectively be detected due to a shared WiFi connection with the first device. Alternatively or additionally, one or both of the devices may include location determining software and/or hardware (e.g., global positioning system (GPS), base-station triangulation) that is used to determine if the second device is proximate to the first device.

In operation 743, in accordance with the a determination that more than one device is present, an alert-output device is selected. In some implementations, if there are more than two devices in proximity, the alert-output device is selected from a group of three or more devices. As described above, the devices may include a wearable electronic device, a mobile telephone, a notebook computer, a desktop computer, a tablet device, a personal media player device, a television device, or the like.

With regard to operation 743, in some implementations the selection of the alert-output device is performed in accordance with a number of different techniques. In some embodiments the alert-output device is selected based on a user-provided prioritization. For example, the user may provide or designate an ordered priority of multiple devices that may be used to select an appropriate alert-output device.

In some implementations, the alert-output device is selected based on a usage of one or more of the devices that are in proximity to each other. In some embodiments, the usage includes a time of usage. In some cases, a device that has a time of usage that is most recent is selected as the alert-output device. In some implementations, a time of usage is only used if the most recent time is within a threshold (e.g., the data is not too old to be relevant). In some implementations, the usage includes both a time of usage and an amount of usage. In some implementations, the device having an amount of usage that is greater over a predetermined time period is selected as the alert-output device. In some implementations, the usage includes a type of usage. In some implementations, a device having a usage that corresponds to a predetermined usage type is selected as the alert-output device. In some implementations, if the device is being used in accordance with a communications program (e.g., an e-mail program, a text messaging program), the device is selected as the alert-output device.

In operation 745, if an alert-output device is selected, the alert is output on the alert-output device. In some instances, the alert is output in accordance with one or more other aspects of the present disclosure. In some instances, the alert output includes one or more components (audio, haptic, visual) that correspond to one or more environmental conditions. In some cases, the alert output is fixed or selected by the user.

With regard to operation 745, in some embodiments, only the alert-output device outputs the alert associated with a particular event. For example, no other device that has been determined to be proximate to the user outputs an alert associated with the event. In some embodiments all devices that are determined to be proximate to the user are updated in response to the event, but only the alert-output device outputs an alert. For example, an email or message may be loaded or delivered to all of the devices, but the alert associated with the reception of the e-mail is only output on, for example, a wearable electronic device worn by the user. In some cases, the user may perceive the alert on the wearable device and then check the message on a phone, laptop, or tablet.

With regard to operation 745, in some cases, the alert is relayed to the alert-output device using a device that is not selected as alert-output device. For example, with reference to FIG. 3, a notification of an incoming message may be received by a user's mobile telephone 130. If the user's wearable electronic device 100 is selected as the alert-output device, the mobile telephone 130 may relay the notification to the wearable device 100 in order to trigger an alert output. Alternatively, the mobile telephone 130 may generate a portion of the alert, which may be relayed and output using the wearable device 100. In some cases, if no interaction with the alert-output device is detected for a predetermined time after the alert is sent, a subsequent alert is output using one or more of the other devices that were not selected as an alert-output device.

In operation 744, in accordance with a determination that there is not another device present, the alert is output on the first device. In particular, if there are no other devices proximate to the user (or determined to be proximate to the user), the alert is output on the device that detected the event.

In one specific example depicted in FIG. 3, the user wearing a wearable electronic device 100 and has a mobile telephone 130 placed in a pocket. In one scenario, the user receives an e-mail, which triggers an event that is detected by the mobile telephone 130. In some implementations, the mobile telephone 130 detects or has detected the proximity of the wearable electronic device 100 by, for example, having previously been paired using a Bluetooth or other wireless connection. In some implementations, the mobile telephone 130 has been in a dormant state for a period of time due to the placement in the user's pocket. Due to the low or non-usage of the mobile telephone 130, the wearable electronic device 100 is selected as the alert-output device. In this scenario, the alert associated with the incoming e-mail is relayed to and output on the wearable electronic device 100.

Figure 7F:
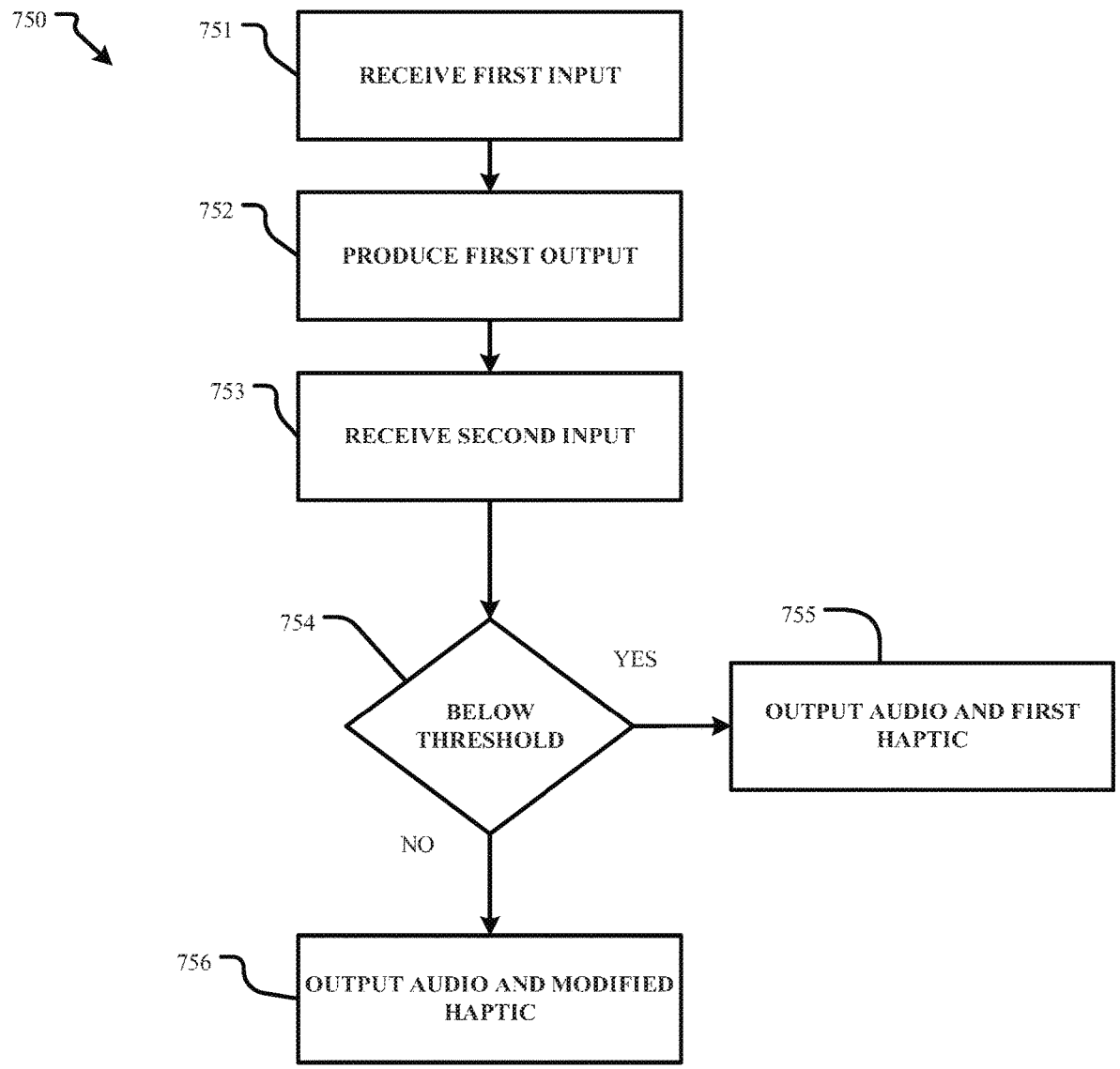
FIG. 7F depicts a process for producing an audio and haptic feedback in response to a user input according to one or more embodiments of the present disclosure.

FIG. 7F depicts a process 750 for producing an audio and haptic feedback in response to a user input according to one or more embodiments of the present disclosure. In some implementations, the device is configured to produce a stimulus that may provide feedback for a user-action or input to the device. As previously mentioned, a stimulus or feedback may be useful for some user input components, such as electronic sensors, that may have few or no moving parts to provide feedback to the user that an input is being received. For example, an audio and haptic component may be output in response to a user's interaction with a touch screen or interaction with a rotational dial or button on the device. In some cases, the stimulus may be adapted to mimic a sound or haptic response that the user may associate with a more traditional mechanical device. The operations of process 750 may be performed using, for example, the example devices described above with respect to FIGS. 1A-B and 5.

In operation 751, a first input is received on the device. In some implementations, the first input is received via, for example, touch-sensitive surface of the device, a crown or dial, or some other user input device. With reference to FIG. 5, in some case, a user input is received as a translational panning or scrolling input 615 on the touch-sensitive surface of the display 110. In some implementations, the user input is received as a rotational input 612 provided using the crown 610 of the device 100.

Returning to FIG. 7F, with respect to operation 751, in some cases the first input is below an input threshold. For example, the speed or rate of the first input may be slower than a threshold. With respect to an input on a touch-sensitive surface, the movement of the touch may be below a threshold rate. Similarly, with respect to an input via a crown or dial, the speed of the rotation may be below a threshold rate.

In operation 752, in response to detecting the first input, a first output is produced. In some embodiments, the first output includes a haptic component for the first input that is coordinated with an audio component for the first input. In some cases, the haptic component is a tap or bump created by a haptic actuator integrated with the device. In some instances, the audio component include sa beep or click that corresponds with the tap or bump created by the haptic actuator. In some implementations, the haptic component is synchronized with the audio component. In some instances, the haptic component has an output that is simultaneous to or at a fixed timing relationship with respect to the output of the audio component.

With regard to operation 752, the first output corresponds to the rate or speed of the first input. In some implementations, when a user scrolls through a list of items using a touch screen, a haptic tap and an audio beep or click corresponds to the progression through the list caused by the first input. As previously mentioned, this may be more readily perceived by the user or more satisfying than, for example, the visual scrolling of the items alone. In some implementations, a user provides a rotational input via, for example the crown 160 or knob of the device depicted in FIG. 5. In this case, a haptic tap and an audio click can, optionally be output for every, for example, 5 degrees of rotation of the crown or knob. In this way, the user receives feedback on the speed that the input is being received by the device.

In operation 753, a second input is received on the device. Similar to operation 751, in some implementations, the second input is received via a touch-sensitive surface, crown, or other input device. In the present example, the second input is provided via the same input device as the first input of operation 751. In some implementations, the second input occurs immediately after the first input or, alternatively, the second input occurs after a delay.

In operation 754, a determination is made with regard to the second input. In particular, a determination is made regarding whether the second input is above or below an input threshold. In some implementations, the input threshold is set or determined based, in part, on the limitations of the hardware used to provide the feedback output. In some implementations, a haptic actuator has a minimum response time that is an inherent property or physical limitation of the haptic actuator mechanism, which typically includes a moving mass. An example haptic actuator is described in more detail below with respect to FIG. 11. In some embodiments, the minimum response is due to the time it takes to initiate movement of the mass, produce a haptic output, and stop movement of the mass. If a series of haptic outputs has an output rate that exceeds the minimum response time, the actuator may not be able to recover from a previous output before sending out the next output in the series. Thus, in some embodiments there is an upper limit on the rate at which the haptic actuator can provide a series of distinct outputs. In some cases, input threshold of operation 754 is determined, at least in part, based on the upper limit of the haptic actuator.

In operation 755, in accordance with a determination that the second input is below the input threshold, the output is similar to the output produced for operation 752. In some implementations, the second input output includes a haptic component for the second input that is coordinated with an audio component for the second input. Similar to the previous example, in some implementations, the haptic component is synchronized with the audio component. In some implementations, the haptic component has an output that is simultaneous to or at a fixed timing relationship with respect to the output of the audio component.

In operation 756, in accordance with a determination that the second input is above the input threshold, the second output includes a modified haptic component for the second input. In some instances, if it is determined that the rate or speed of the input may exceed the capabilities of the haptic actuator, the output is modified. In some embodiments, if the second input is above the input threshold, the haptic component for the second input is asynchronous with respect to the audio component for the second input. In some embodiments, the asynchronous haptic output is a continuous haptic output. In some instances, the second output includes a continuous haptic output but maintain a distinct audio "click" output that corresponds to an amount of input that is provided. In some cases, the continuous haptic output includes inflection points or periods of varying intensity. In some implementations, the inflection points may of the haptic output are not be synchronized with the audio output.

Figure 8:
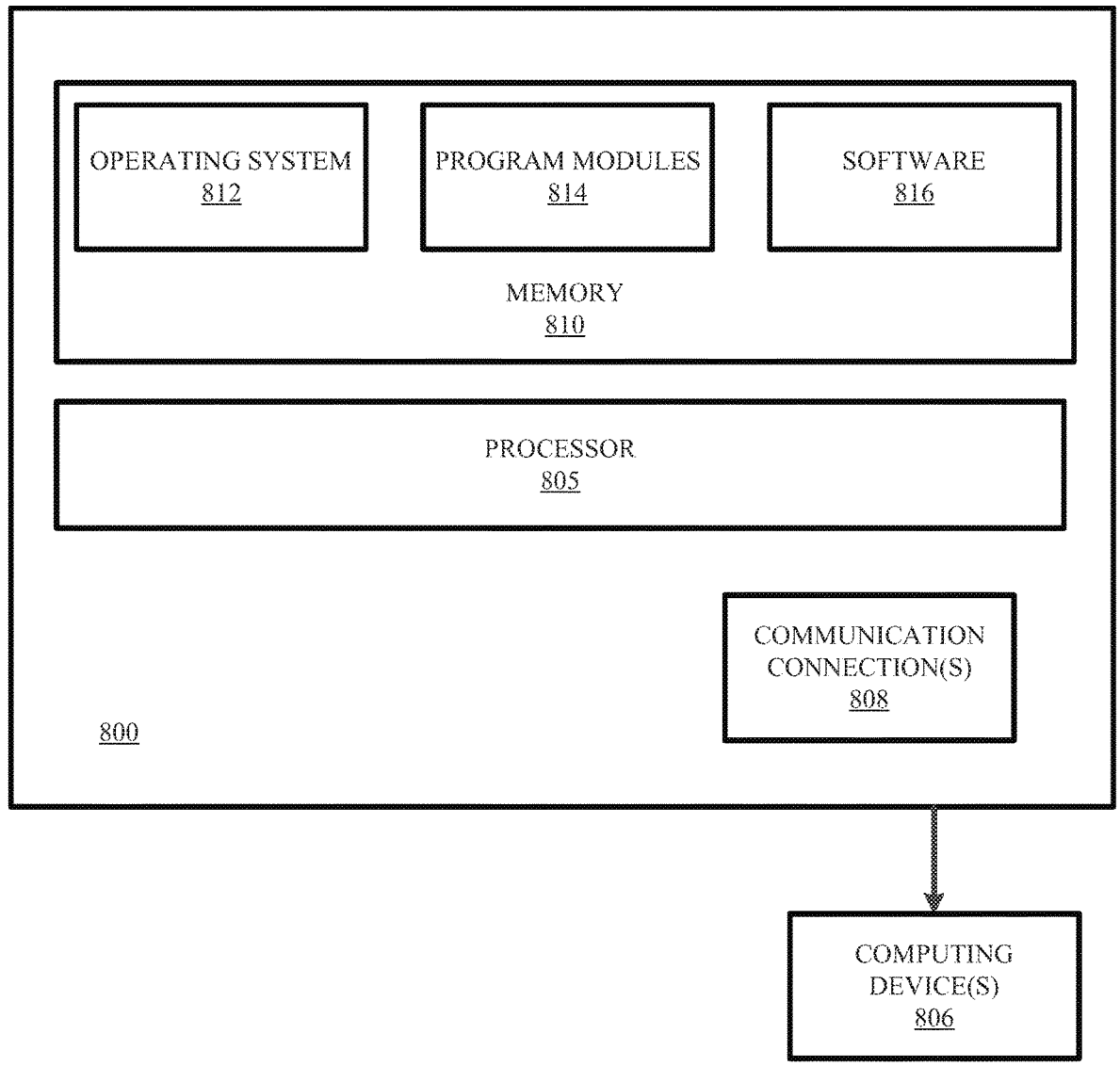
FIGS. 8-9 are block diagrams of an example electronic device that may be used with one or more embodiments of the present disclosure.

FIG. 8 depicts a block diagram illustrating exemplary components, such as, for example, hardware components of an electronic device 800 according to one or more embodiments of the present disclosure. In certain embodiments, the electronic device 800 is similar to the wearable electronic device 100 described above with respect to FIG. 1A or the electronic device 130 described above with respect to FIG. 1B. Although various components of the device 800 are shown, connections and communication channels between each of the components are omitted for simplicity.

In a basic configuration, the electronic device 800 may include at least one processor 805 and an associated memory 810. In some embodiments, the memory 810 comprises, but is not limited to, volatile storage such as random access memory, non-volatile storage such as read-only memory, flash memory, or any combination thereof. In some embodiments, the memory includes removable and non-removable memory components, including, for example, magnetic disks, optical disks, or tape. In some embodiments, the memory 810 stores an operating system 812 and one or more program modules 814 suitable for running software applications 816. The operating system 812 can be configured to control the electronic device 800 and/or one or more software applications 816 being executed by the operating system 812. In certain embodiments, various program modules and data files are stored in the system memory 810. The program modules 814 and the processor 805 can be configured to perform processes that include one or more of the operations of methods shown and described with respect to FIGS. 7A-F.

The electronic device 800 also includes communication connections 808 that facilitate communications with additional computing devices 806. In some implementations, the communication connections 808 include a radio-frequency (RF) transmitter, a receiver, and/or transceiver circuitry, universal serial bus (USB) communications, parallel ports and/or serial ports.

As used herein, the term computer readable media can, optionally include computer storage media. Computer storage media can, optionally include volatile and nonvolatile media and/or removable and non-removable media implemented in any method or technology for the storage of information. Examples include computer-readable instructions, data structures, or program modules. The memory 810, which can, optionally include the removable and non-removable storage devices, is one example of computer storage media. Computer storage media can, optionally include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage media can, optionally be part of the electronic device 800.

Figure 9:
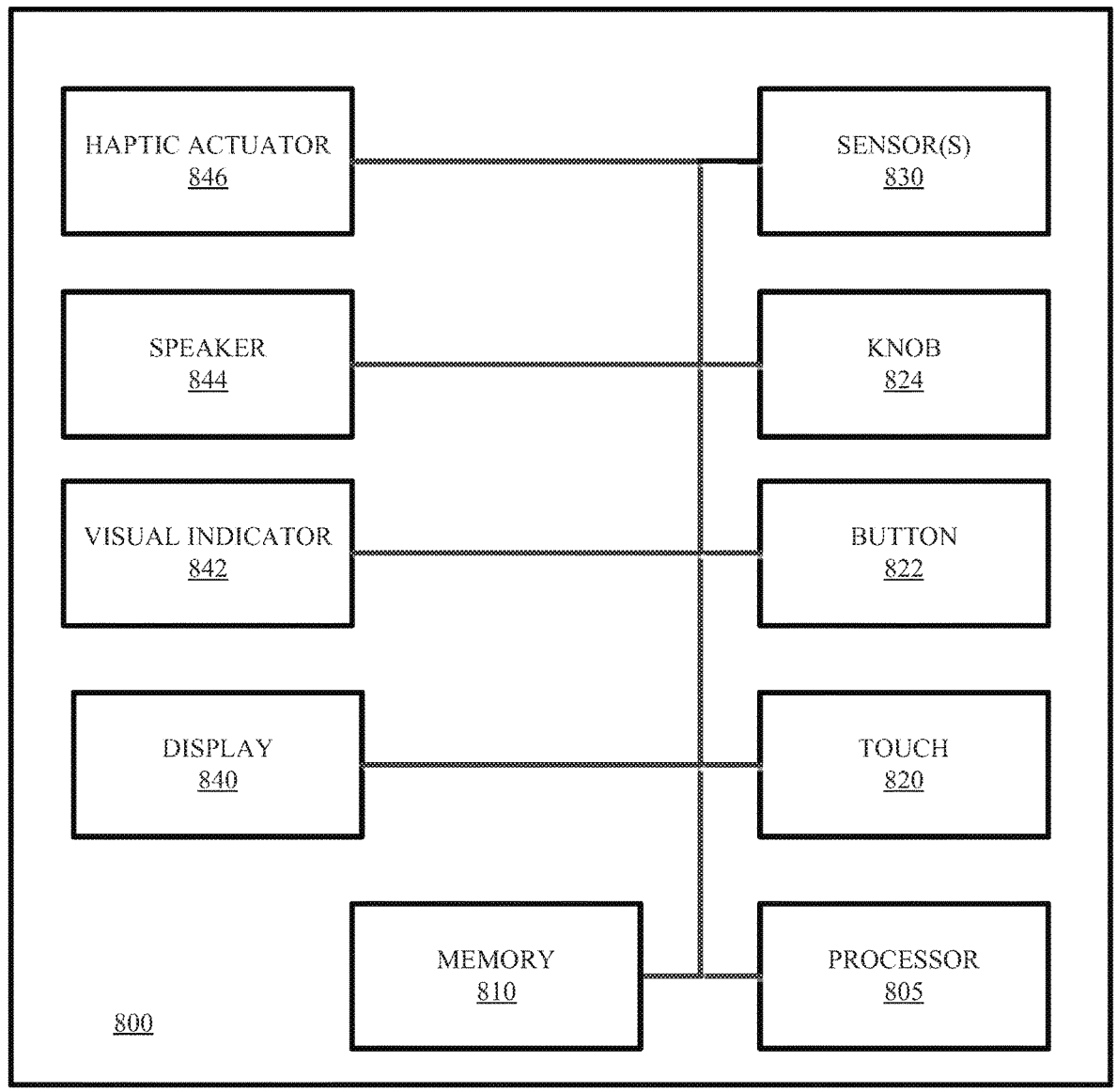

FIG. 9 depicts additional aspects of the electronic device 800 according to one or more embodiments of the present disclosure. FIG. 9 is a block diagram illustrating the architecture of an electronic device such as electronic device 100 shown and described with respect to FIG. 1A or electronic device 130 shown and described with respect to FIG. 1B.

As shown in FIG. 9, multiple components are operably connected to the processor 805 and the memory 810 of the device 800. In particular, one or input components are coupled to the processor 805. In some embodiments, a touch-sensitive device 820, such as a touch sensor or touch screen is integrated with a surface of the device. In some embodiments, the touch sensor or touch screen includes a capacitive sensor that is configured to detect the location of one or more touches on the surface of the device. Additionally or alternatively, in some embodiments, the device includes a force sensor that is configured to detect and measure the force of a touch on a device.

In the present embodiment, the device 800 includes one or more buttons 822 and knobs 824 that are configured to accept user input. Additional user input can, optionally be provided via a keyboard, mouse, pen or stylus, sound input device, and the like. With reference to the example described above with respect to FIG. 6, the knob 824 can include a crown of a portable electronic device. In some embodiments, the knob 834 or crown is operatively coupled to a position sensor, such as an optical encoder, that is configured to produce an output in response to a rotational input. A more detailed description of a knob/crown having a position sensor is described below with respect to FIG. 12.

In some embodiments, other input to the device 800 is provided by one or more sensors 830. As previously described with respect to FIGS. 1A-B, an example device includes one or more environmental sensors that are configured to monitor and detect one or more environmental conditions. Example sensors 830 include motion sensors, including accelerometers, gyroscopes, tilt sensors, and the like. In some embodiments, the sensors 830 also include one or more optical sensors, including, an image sensor, ALS sensor, proximity sensor, and the like. In some embodiments, the sensors 830 also include a microphone or other audio sensing device.

In some embodiments, the device 800 includes one or more devices or components for providing output to the user. As shown in FIG. 9, the device includes a display 840 for presenting visual information or output to the user. In some embodiments, the display 840 is formed from a liquid crystal display (LCD), organic light emitting diode (OLED) display, organic electroluminescence (OEL) display, or other type of display device. In some embodiments, the device 800 includes a visual indicator 842, such as a beacon or strobe light, that is configured to provide additional visual output to the user.

In the example of FIG. 9, the device 800 includes a speaker 844 or other acoustic component. The speaker 844 can be used to produce an audio output in accordance with some aspects of the disclosure. An example speaker component is described below with respect to FIG. 10. In the example of FIG. 9, the device 800 also includes a haptic actuator 846 that is configured to produce a haptic output in accordance with some aspects of the disclosure. An example haptic actuator is described below with respect to FIGS. 11A-B.

In one or more embodiments, data and information generated or captured by the electronic device 800 is stored locally. Additionally or alternatively, the data can be stored on any number of storage media that can, optionally be accessed by the electronic device 800 using the communications connection (808 in FIG. 8), a wired connection or a wireless connection between the electronic device 800 and a remote computing device 806. Additionally, data and information can be readily transferred between computing devices.

Figure 10:
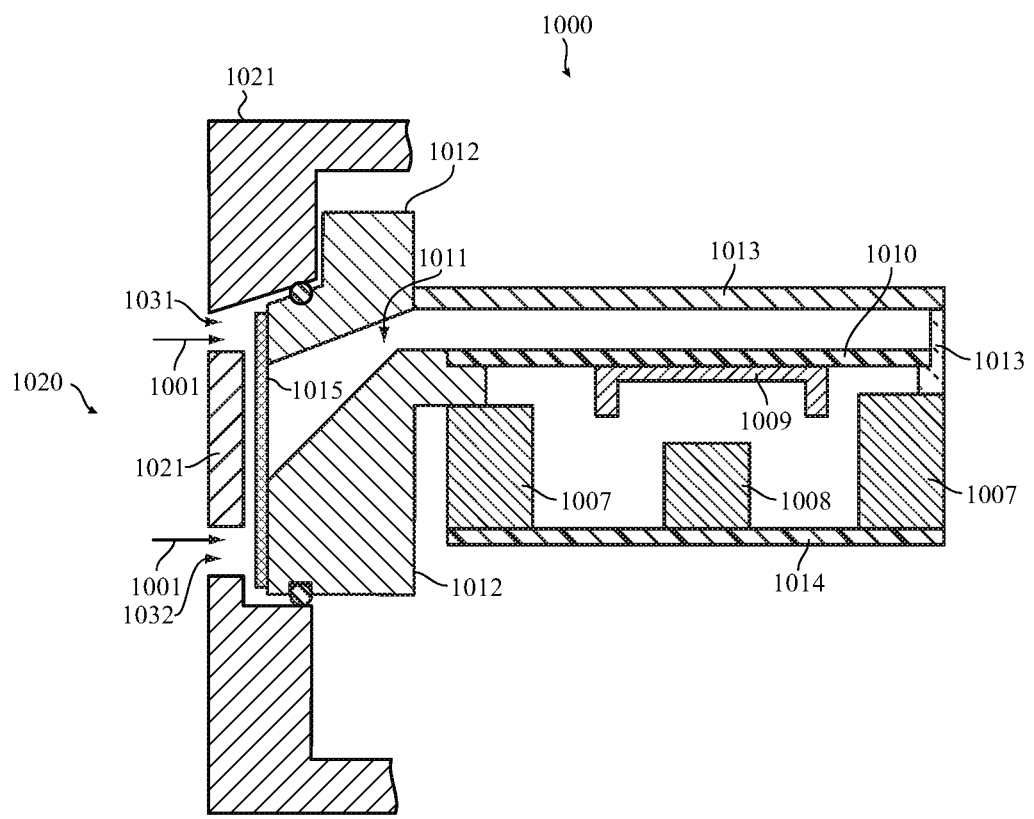
FIG. 10 depicts an example acoustic module of an electronic device that may be used with one or more embodiments of the present disclosure.

FIG. 10 depicts an example acoustic module in accordance with some embodiments. As described above, in some embodiments, the device includes one or more devices for transmitting acoustic energy. In particular, embodiments of the device include a speaker for transmitting acoustic energy. FIG. 10 depicts a simplified schematic cross-sectional view of a first embodiment of a device having an speaker 1000. The representation depicted in FIG. 10 is not drawn to scale and does not include all elements of every embodiment of a speaker. The speaker 1000 is representative of speakers or acoustic elements described with respect to one or more embodiments described herein.

In the example depicted in FIG. 10, the speaker 1000 includes various components for producing and transmitting sound, including a diaphragm 1010, a voice coil 1009, a center magnet 1008, and side magnets/coils 1007. In one implementation, the diaphragm 1010 is configured to produce sound waves or an acoustic signal in response to a stimulus signal in the center magnet 1008. For example, a modulated stimulus signal in the center magnet 1008 causes movement of the voice coil 1009, which is coupled to the diaphragm 1010. Movement of the diaphragm 1010 creates the sound waves, which propagate through the acoustic cavity 1011 of acoustic module 106 and eventually out the acoustic port 1020 to a region external to the device. In some cases, the acoustic cavity 1011 functions as an acoustical resonator having a shape and size that is configured to amplify and/or dampen sound waves produced by movement of the diaphragm 1010.

As shown in FIG. 10, the speaker 1000 also includes a yoke 1014, support 1013, connector element 1012, and a cavity wall 1013. These elements provide the physical support of the speaker elements. Additionally, the connector element 1012 and the cavity wall 1013 together form at least part of the acoustic cavity 1011. The specific structural configuration of FIG. 10 is not intended to be limiting. For example, in alternative embodiments, the acoustic cavity can, optionally be formed from additional components or can, optionally be formed from a single component.

The speaker 1000 depicted in FIG. 10 is provided as one example of a type of speaker or acoustic module. In some implementations, the speaker includes different configurations for producing and transmitting sound, including, for example, a vibrating membrane, piezoelectric transducer, vibrating ribbon, or the like. In some implementations, the acoustic module is a microphone acoustic module having one or more elements for converting acoustic energy into an electrical impulse. For example, the acoustic module can, optionally alternatively include a piezoelectric microphone element for producing a charge in response to acoustic energy or sound.

As shown in FIG. 10, an acoustic port 1020 is formed in the case 1021 of the electronic device. In the present example, the acoustic port 1020 includes a first and second orifice 1031, 1032 that are formed in the case 1021 and acoustically couple the acoustic cavity 1011 of the speaker 1000 to the external environment (external to the electronic device). In the present embodiment, the first and second orifices 1031, 1032 are offset with respect to the opening of the acoustic cavity 1011. This configuration may help reduce the direct ingress of liquid 1001 into acoustic cavity 1011 of the speaker 1000. Also, as shown in FIG. 10 a shield 1021 or umbrella structure that is formed between the orifices 1031, 1032 blocks the direct ingress of fluid 1001 into the acoustic cavity 1011. As shown in FIG. 10, the speaker 1000 also includes a screen element 1015 disposed at one end of the acoustic cavity 1011, which may also prevent the ingress of liquid or other foreign debris into the acoustic cavity 1011.

Figure 11A:
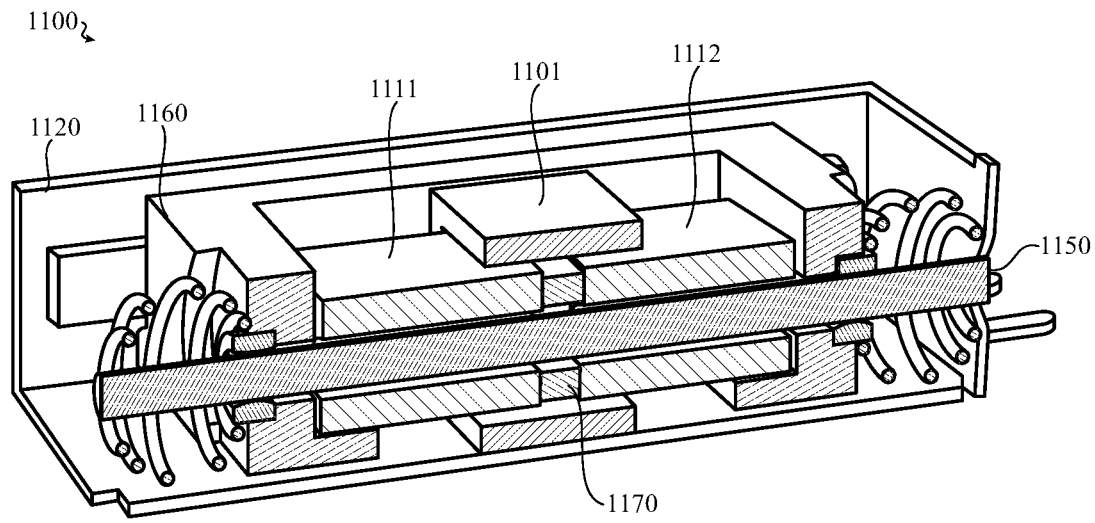
FIGS. 11A-B depict an example haptic actuator of an electronic device that may be used with one or more embodiments of the present disclosure.
Figure 11B:
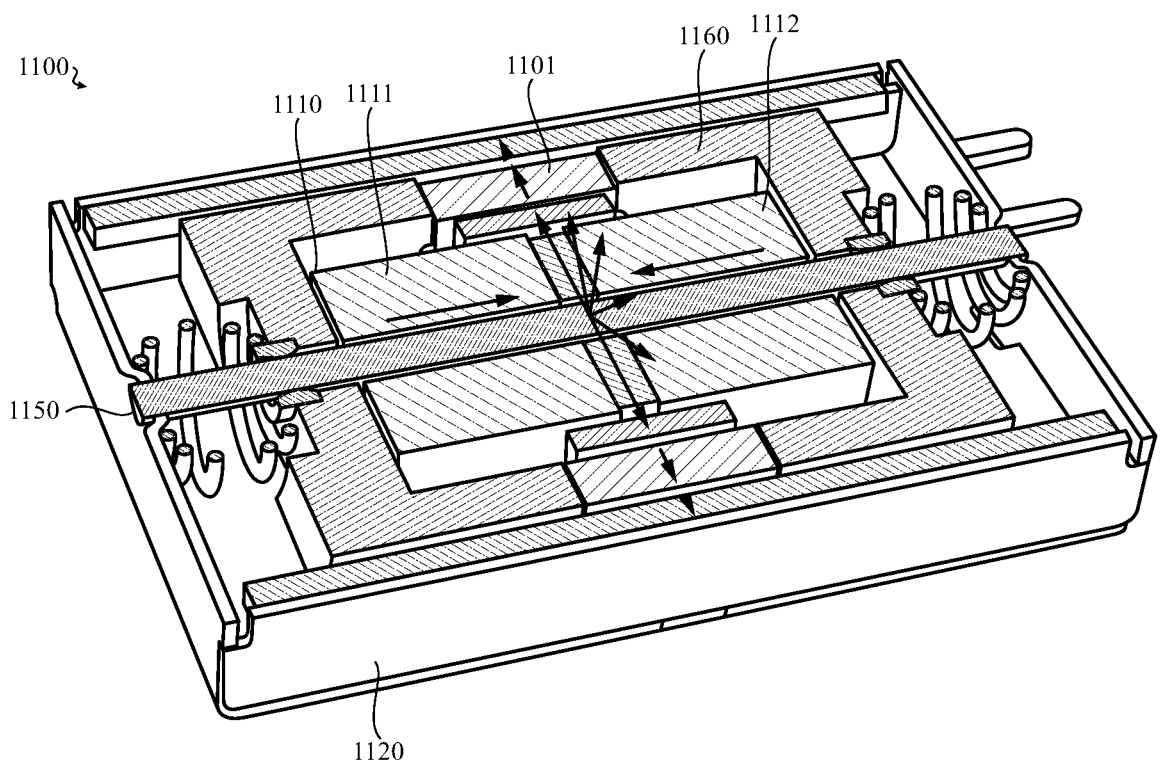

FIGS. 11A-B depict an example haptic actuator in accordance with some embodiments. As described above, some embodiments of the device includes one or more haptic modules for providing haptic feedback to the user. In some embodiments, a haptic device is configured to produce a mechanical movement or vibration that is transmitted through the case and/or other component of the device. In some cases, the movement or vibration is transmitted to the skin of the user and perceived as a stimulus or haptic feedback by the user.

The space constraints associated with a wrist-worn device may present unique challenges to integrating a haptic mechanism into wearable electronics. In particular, a haptic mechanism may use a moving mass used to create the movement or vibration of the haptic output. The larger the mass that is moved, the easier it may be to create a perceivable stimulus using the haptic mechanism. However, a large moving mass and the supporting mechanism may be difficult to integrate into the compact space of, for example, the case of a wearable electronic wristwatch device. FIGS. 11A-B depict one example haptic mechanism suitable for use in a wearable electronic device. While the embodiment described with respect to FIGS. 11A-B is provided as one example, the haptic module is not limited to this particular configuration.

FIG. 11A depicts a three-quarters perspective view of the of a haptic module 1100, with a top, front and left sidewall of the case 1120 removed to expose internal components. FIG. 11B depicts a cross-sectional perspective view of the haptic module 1100 cut in half to expose the internal components. In this example, a coil 1101 is used to induce movement of a frame 1160, which houses a central magnet array 1110. As shown in FIGS. 11A-B, the movement of the frame 1160 is guided by a shaft 1150 that is fixed with respect to a case 1120.

In the present example, the coil 1101 is energized by transmitting a current (e.g., from the battery) along a length of a wire that forms the coil 1101. A direction of the current along the wire of the coil 1101 determines a direction of a magnetic field that emanates from the coil 1101. In turn, the direction of the magnetic field determines a direction of movement of the frame 1160 housing the central magnet array 1110. One or more springs can, optionally bias the frame 1160 towards the middle region of the travel. In this example, the frame 1160 and central magnet array 1110, through operation of the coil 1101 function as a moving mass, which generates a tap or vibration. The output of the haptic module 1100, created by the moving mass of the frame 1160 and central magnet array 1110, may be perceived as a haptic feedback or stimulus to the user wearing the device.

For example, when the coil 1101 is energized, the coil 1101 generates a magnetic field. The opposing polarities of the magnets in the magnet array 1110 generates a radial magnetic field that interacts with the magnetic field of the coil 1101. The Lorentz force resulting from the interaction of the magnetic fields causes the frame 1160 to move along the shaft 1150 in a first direction. Reversing current flow through the coil 1101 reverses the Lorentz force. As a result, the magnetic field or force on the central magnet array 1110 is also reversed and the frame 1160 moves in a second direction. Thus, frame 1160 can, optionally move in both directions along the shaft 1150, depending on the direction of current flow through the coil.

As shown in FIG. 11A, the coil 1101 encircles the central magnet array 1110, which is disposed near the center of the frame 1160. As previously described, the coil 1101 can, selectively be energized by transmitting a current along the length of the wire forming the coil 1101 and the direction of the current flow determines the direction of the magnetic flux emanating from the coil 1101 in response to the current. Passing an alternating current through the coil 1101 causes the central magnet array 1110 (and frame 1160) to move back and forth along a shaft 1150. In order to prevent the central magnet array 1110 from being attracted to the shaft 1150, which could increase friction between the two and thereby increase the force necessary to move the central magnet array 1110 and frame 1160, the shaft 1150 can, optionally be formed from a non-ferritic material such as tungsten, titanium, stainless steel, or the like.

As depicted in FIGS. 11A-B, the coil 1101 is positioned within a frame 1160 that holds the central magnet array 1110, but is not affixed to the coil 1101. Rather, an air gap separates the coil 1101 from the central magnet array 1110 and the frame 1160 is free to move with respect to the coil 1101, which is generally stationary. Further, the frame 1160 generally moves with the central magnet array 1110. As illustrated in FIG. 11A-B, the frame 1160 has an aperture formed therein of sufficient size to contain the coil 1101. Even when the frame and central magnet array are maximally displaced within the case 1120 (e.g., to one end or the other of the shaft 1150), the coil 1101 does not contact any portion of the frame 1160. In the present embodiment, the coil 1101 remains stationary in the case 1120 while the frame 1160 and central magnet array 1110 move, although in other embodiments the coil 1101 moves instead of, or in addition to, the frame and/or central magnet array.

As shown in FIGS. 11A-B, the central magnet array 1110 is formed from at least two magnets 1111, 1112 of opposing polarities. A center interface 1170 can, optionally be formed from a ferritic or non-ferritic material, depending on the embodiment. A ferritic material for the center interface 1170 may enhance the overall magnetic field generated by the central magnet array 1110, while a non-ferritic material may provide at least a portion of a return path for magnetic flux and thus assist in localizing the flux within the case 1120. In some embodiments, the magnets 1111, 1112 are formed from neodymium while the frame is tungsten. This combination may provide a strong magnetic field and a dense mass, thereby yielding a high weight per volume structure that may be used as the moving part of the haptic module 1100.

Figure 12:
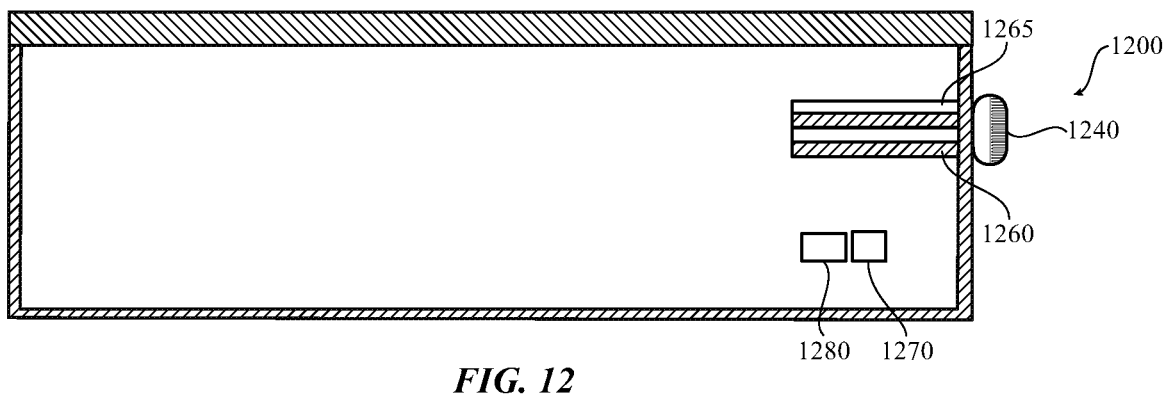
FIG. 12 depicts an example crown with an optical encoder that may be used with one or more embodiments of the present disclosure.

FIG. 12 depicts an example crown with an optical encoder in accordance with some embodiments. The crown and optical encoder of FIG. 12 may correspond to the example crown 610 described above with respect to FIG. 6. In particular, as described above, embodiments of the device include a crown used to accept rotary input from the user, which can be used to control aspects of the device. For example, the crown can be turned by the user to scroll a display or select from a range of values. In some embodiments, the crown can be rotated to move a cursor or other type of selection mechanism from a first displayed location to a second displayed location in order to select an icon or move the selection mechanism between various icons that are output on the display. In a time keeping application, the crown can also be used to adjust the position of watch hands or index digits displayed on the display of the device. The crown can also be used to control the volume of a speaker, the brightness of the display screen, or control other hardware settings.

The embodiments described herein can be used for at least a portion of the crown module integrated into a wearable electronic device. The embodiments are provided as examples and do not necessarily include all of the components or elements used in a particular implementation. Additionally, the crown module is not intended to be limited to the specific examples described below and can vary in some aspects depending on the implementation.

In some embodiments, an optical encoder is used to detect the rotational motion of the crown. More specifically, the example provided below with respect to FIG. 12 uses an optical encoder to detect rotational movement, rotational direction and/or rotational speed of a component of the electronic device. Once the rotational movement, rotational direction and/or rotational speed have been determined, this information can be used to output or change information and images that are presented on a display or user interface of the electronic device.

As shown in the example embodiment of FIG. 12, the optical encoder of the present disclosure includes a light source 1270, a photodiode array 1280, and a shaft 1260. However, unlike some traditional optical encoders, the optical encoder of the present disclosure utilizes an encoding pattern 1265 disposed directly on the shaft 1260. As shown in FIG. 12, the encoding pattern 1265 includes a number of light and dark markings or stripes that are axially disposed along the shaft 1260. Each stripe or combination of stripes on the shaft can be used to identify a position of the shaft 1260. Light emitted from the light source 1270 is reflected off of the shaft 1260 and into the photodiode array 1280. The reflected light can be used to determine the movement of the encoding pattern 1265, and thus the movement of the shaft 1260 and the crown 1200. Using the output from the photodiode array 1280 can be used to determine a position, rotation, rotation direction, and rotation speed of the shaft 1260. Based on the rotation, rotation direction, and/or speed, the encoder output may be used to change information or images that are presented on the display or user interface of the electronic device.

Although a photodiode array is specifically mentioned, embodiments disclosed herein can, optionally use various types of sensors that are arranged in various configurations for detecting the movement described herein. In some embodiments, the movement of the shaft 1260 is detected by an image sensor, a light sensor such as a CMOS light sensor or imager, a photovoltaic cell or system, photo resistive component, a laser scanner and the like.

The signals or output of the optical encoder can be used to control various aspects of other components or modules of the device. For example, continuing with the time keeping application example discussed above, the dial 1240 can be rotated in a clockwise manner in order to advance the displayed time forward. In one implementation, the optical encoder can be used to detect the rotational movement of the dial 1240, the direction of the movement, and the speed at which the dial 1240 is being rotated. Using the output from the optical encoder, the displayed hands of a time keeping application may rotate or otherwise move in accordance with the user-provided rotational input. Additionally, or alternatively, an audio and/or haptic output may be generated in accordance with the rotational movement of the dial 1240. For example, an audio click and/or a haptic tap can be output for every 5 degrees, 10 degrees, or other degree amount of rotation of the dial 1240.

Referring back to FIG. 12, the crown 1200 is formed from dial 1240 that is coupled to the shaft 1260. In some cases, the shaft 1260 and dial 1240 are formed as a single piece. As the shaft 1260 is coupled to, or is otherwise a part of the dial 1240, as the dial 1240 rotates or moves in a particular direction and at a particular speed, the shaft 1260 also rotates or moves in the same direction and with the same speed.

As shown in FIG. 12, the shaft 1260 of the optical encoder includes an encoding pattern 1265. As discussed above, the encoding pattern 1265 can be used to determine positional information about the shaft 1260 including rotational movement, angular displacement and movement speed. As shown in FIG. 12, the encoding pattern 1265 includes an array of light and dark stripes.

Although light stripes and dark stripes are specifically mentioned and shown, the encoding pattern 1265 can consist of various types of stripes having various shades or colors that provide surface contrasts. For example, the encoding pattern 1265 can include a stripe or marking that has a high reflective surface and another stripe that has a low reflective surface regardless of the color or shading of the stripes or markings. In another embodiment, a first stripe of the encoding pattern 1265 causes specular reflection while a second stripe of the encoding pattern causes diffuse reflection. When the reflected light is received by the photodiode array 1280, a determination can be made as to the position and movement of the shaft such as described below. In embodiments where a holographic or diffractive pattern is used, the light from the light source 1270 diffracts from the shaft. Based on the diffracted light, the photodiode array 1280 can determine the position, movement and direction of movement of the shaft 1260.

In some embodiments, the stripes of the encoding pattern 1265 extend axially along the shaft 1260. The stripes extend along the entire length of the shaft 1260 or partially along a length of the shaft 1260. In addition, the encoding pattern 1265 is disposed or formed around the entire circumference of the shaft 1260. In some embodiments, the encoding pattern 1265 includes a radial component. In yet other embodiments, the encoding pattern 1265 includes both a radial component and an axial component.

Figure 13:
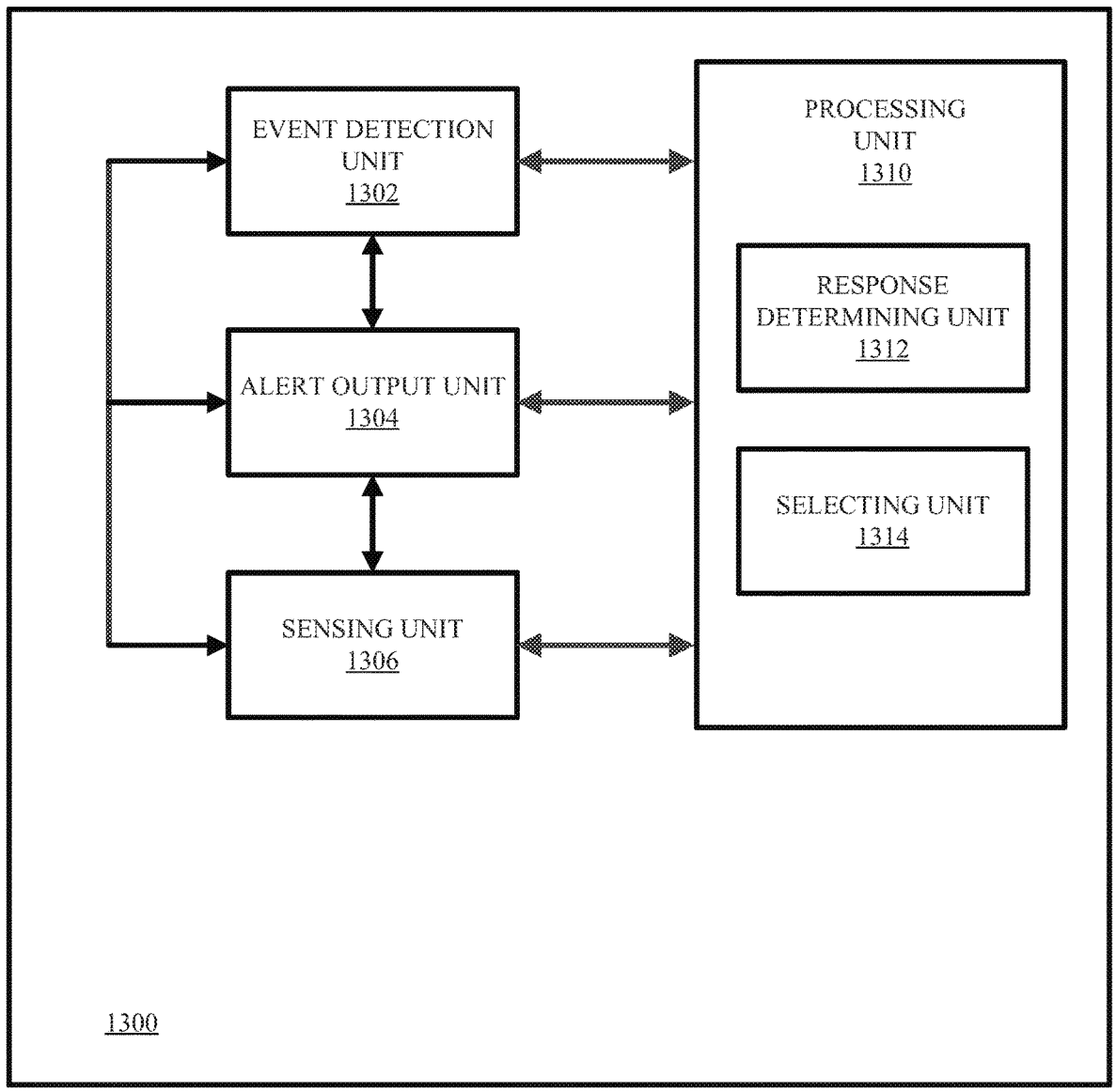
FIGS. 13-18 depict functional block diagrams of electronic devices in accordance with some embodiments.

In accordance with some embodiments, FIG. 13 shows a functional block diagram of an electronic device 1300 configured in accordance with the principles of the various described embodiments. In particular, the electronic device 1300 can be used to perform the process 700 described above with respect to FIG. 7A. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes an event detection unit 1302 configured to detect the occurrence of an event, an alert output unit 1304 configured to output an alert, a sensing unit 1306 configured to detect one or more environmental conditions, and a processing unit 1310 coupled to the event detection unit 1302, the alert output unit 1304, and the sensing unit 1306. In some embodiments, the processing unit 1310 includes a response determining unit 1312 and a selecting unit 1314.

The processing unit 1310 is configured to, while the device is subject to the one or more environmental conditions, detect the occurrence of an event (e.g., using the event detection unit). In response to detecting the occurrence of the event, determine a response to the event (e.g., using the response determining unit) based on a current alert mode selected from a set of three or more alert modes (e.g., using the selecting unit), the selection based on the one or more environmental conditions (e.g., using the sensing unit). The determining the response includes: in accordance with a determination that the current alert mode is a first alert mode, outputting a first alert in response to the event (e.g., using the alert output unit), and in accordance with a determination that the current alert mode is a second alert mode, outputting a second alert in response to the event (e.g., using the alert output unit), wherein the second alert is different from the first alert.

In some embodiments, the current alert mode is automatically selected (e.g., using the selecting unit), based on the one or more environmental conditions prior detecting the occurrence of the event. The current alert mode is automatically selected using an environmental sensor (e.g., of the sensing unit 1306) that is configured to detect the one or more environmental conditions. In some embodiments, the environmental sensor is a microphone configured to detect an ambient sound level, and the current alert mode that is selected (e.g., using the selecting unit 1314) includes one or more of: a visual component that corresponds to the ambient sound level, an audio component that corresponds to the ambient sound level and a haptic component that corresponds to the ambient sound level. In some embodiments, the environmental sensor is a motion sensor configured to detect an activity level, and the current alert mode that is selected (e.g., using the selecting unit 1314) includes one or more of: a visual component that corresponds to the activity level, an audio component that corresponds to the activity level and a haptic component that corresponds to the activity level. In some embodiments, the environmental sensor is an image sensor configured to detect an ambient light level, and the current alert mode that is selected (e.g., using the selecting unit 1314) includes one or more of: a visual component that corresponds to the ambient light level, an audio component that corresponds to the ambient light level, and a haptic component that corresponds to the ambient light level. In some embodiments, the environmental sensor is a battery power sensor configured to detect a current battery level, and the current alert mode that is selected (e.g., using the selecting unit 1314) includes one or more of an audio component and a haptic component, wherein an estimated peak power output of the current alert mode corresponds to the current battery level.

In some embodiments, the first alert mode includes a first haptic component and a first visual component, and the second alert mode includes a second haptic component and no visual component. In some embodiments, the first alert mode includes a first audio component and a first haptic component, and the second alert mode includes a second audio component and second haptic component, wherein the first audio and first haptic component are different than the second audio component and the second haptic component, respectively. In some embodiments, the first alert mode includes no audio component and no haptic component. In some embodiments, the first alert mode includes a first audio component and a first haptic component offset by a first delay, and the second alert mode includes the first audio component and the first haptic component offset by a second delay that is different than the first delay.

In some embodiments, the processing unit 1310 is further configured to, after selecting the current alert mode, select a subsequent current alert mode (e.g., using the selecting unit 1314) based on a changed environmental condition. In some embodiments, determining the response to the event includes, in accordance with a determination that the current alert mode is a third alert mode (e.g., using the response determining unit 1312), outputting a third alert in response to the event, wherein the third alert is different from the first alert and the second alert.

Figure 14:
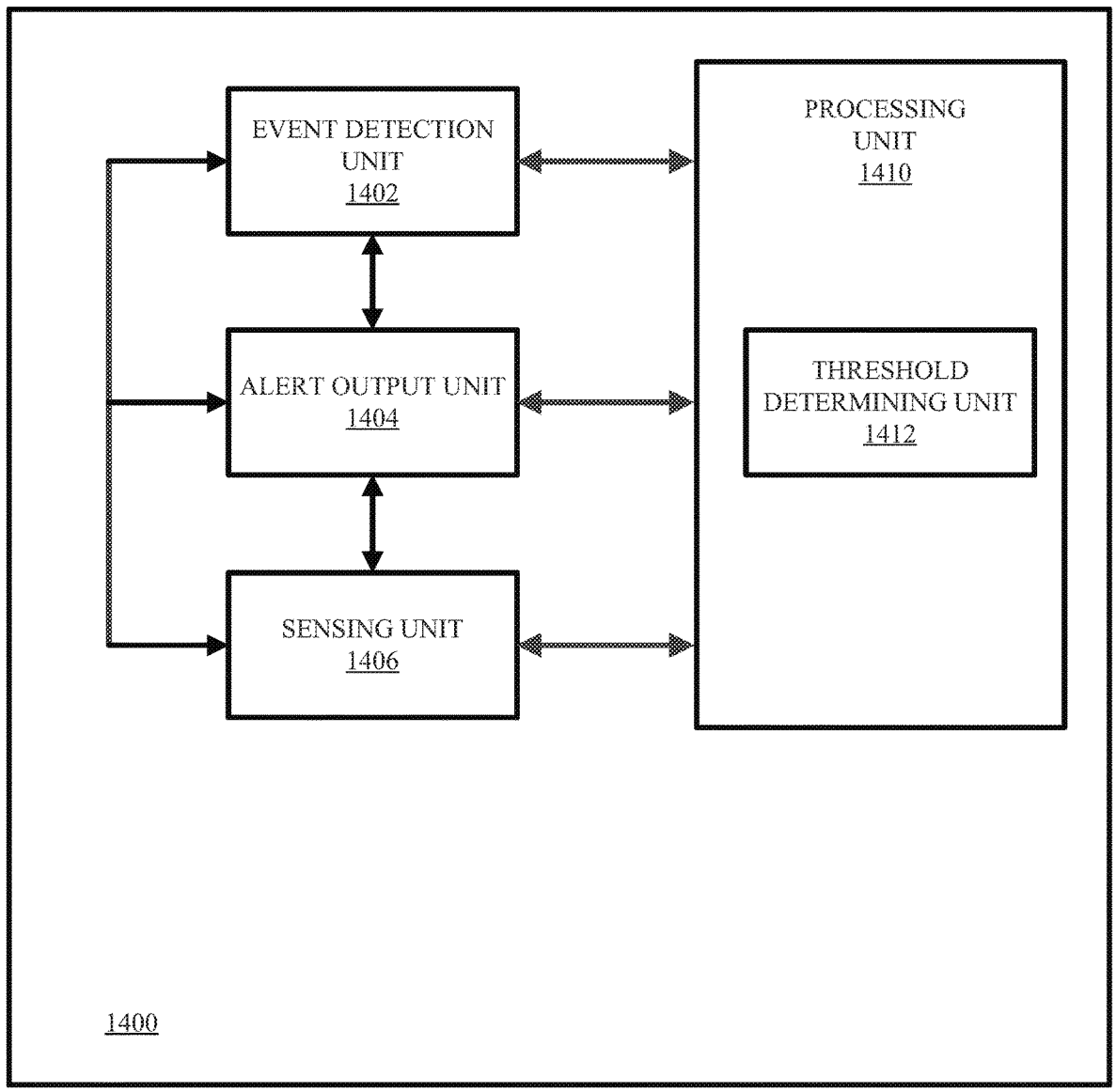

In accordance with some embodiments, FIG. 14 shows a functional block diagram of an electronic device 1400 configured in accordance with the principles of the various described embodiments. In particular, the electronic device 1400 can be used to perform the process 710 described above with respect to FIG. 7B. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes an event detection unit 1402 configured to detect the occurrence of an event, an alert output unit 1404 configured to output an alert, a sensing unit 1406 configured to detect an activity level, and a processing unit 1410 coupled to the event detection unit 1402, the alert output unit 1404, and the sensing unit 1406. In some embodiments, the processing unit 1410 includes a response determining unit 1412 configured to determine if an activity level exceeds a threshold.

The processing unit 1410 is configured to, detect an event (e.g., using the event detection unit 1402) and, in response to detecting the event, in accordance with a determination that an activity level exceeds a threshold (e.g., using the threshold determining unit 1412), forgoing outputting an alert. In accordance with a determination that the activity level does not exceed the threshold (e.g., using the threshold determining unit 1412), outputting the alert (e.g., using the alert output unit 1404).

In some embodiments, the activity level is determined using a motion sensor of the electronic device (e.g., using the sensing unit 1406). In some embodiments, the activity level is determined using a motion sensor of the electronic device to detect a number of motion events over a predetermined time (e.g., using the sensing unit 1406).

In some embodiments, the processing unit 1410 is further configured to, after forgoing outputting the alert, detect that the activity level has dropped below a low-activity threshold (e.g., using the threshold determining unit 1412) and output the alert (e.g., using the alert output unit 1404). In some embodiments, the low-activity threshold is different than the threshold. In some embodiments, the processing unit 1410 is further comprised to, after a predetermined amount of time after forgoing the alert, make a subsequent determination (e.g., using the threshold determining unit 1412) whether the threshold has been exceeded, and, in accordance with the subsequent determination that the activity level exceeds a threshold (e.g., using the threshold determining unit 1412), forgo outputting an alert, and in accordance with the subsequent determination that the activity level does not exceed the threshold (e.g., using the threshold determining unit 1412), outputting the alert (e.g., using the alert outputting unit 1404).

Figure 15:
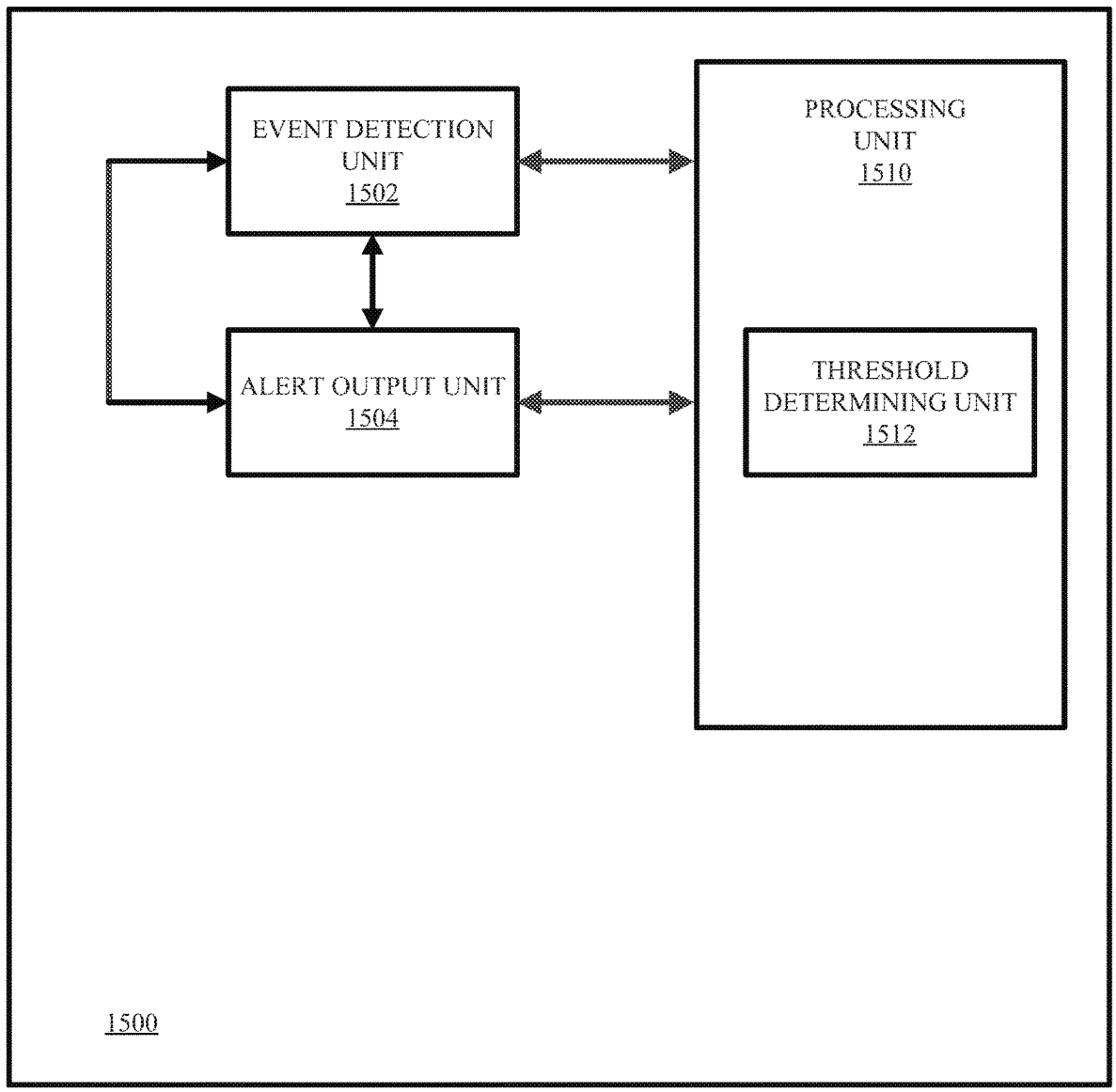

In accordance with some embodiments, FIG. 15 shows a functional block diagram of an electronic device 1500 configured in accordance with the principles of the various described embodiments. In particular, the electronic device 1500 can be used to perform the process 720 described above with respect to FIG. 7C. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes an event detection unit 1502 configured to detect the occurrence of an event, an alert output unit 1504 configured to output an alert, and a processing unit 1510 coupled to the event detection unit 1502 and the alert output unit 1504. In some embodiments, the processing unit 1410 includes a threshold determining unit 1512 that is configured to determine whether a number of events exceeds a threshold.

The processing unit 1510 is configured to detecting an event (e.g., using the event detection unit 1502). In response to detecting the event, the processing unit 1510 is further configured to, in accordance with a determination that a number of events that have been detected over a predetermined period exceeds a threshold (e.g., using the threshold determining unit 1512), and outputting an alert (e.g., using the alert output unit 1504), and in accordance with a determination that the number of events that have been detected over the predetermined period does not exceed the threshold (e.g., using the threshold determining unit 1512), forgoing outputting the alert.

In some embodiments, the processing unit 1510 is further configured to detect a subsequent event (e.g., using the event detection unit), and in response to detecting the subsequent event: if an alert associated with a previous event has been forgone, and in accordance with a determination that the number of events that have been detected over the predetermined period exceeds the threshold (e.g., using the threshold determining unit 1512), outputting the alert (e.g., using the alert output unit 1504), wherein the alert is based, at least in part, on the previous event having the alert that has been forgone. In some embodiments, the determination as to whether or not the number of events that have been detected over the predetermined period (e.g., using the threshold determining unit 1512) includes counting the event. In some embodiments, the determination as to whether or not the number of events that have been detected over the predetermined period (e.g., using the threshold determining unit 1512) includes counting one or more prior events that were detected within the predetermined period before the event was detected. In some embodiments, the alert includes information indicative of the event and one or more prior events occurring prior to the event. In some embodiments, a strength of the alert (e.g., using the alert output unit 1504) corresponds to the number of detected events. In some embodiments, the strength of the alert corresponds to a frequency and a type of detected events. In some embodiments, the event includes one or more of: receiving an e-mail, receiving a phone call, receiving a message, and receiving calendar reminder.

Figure 16:
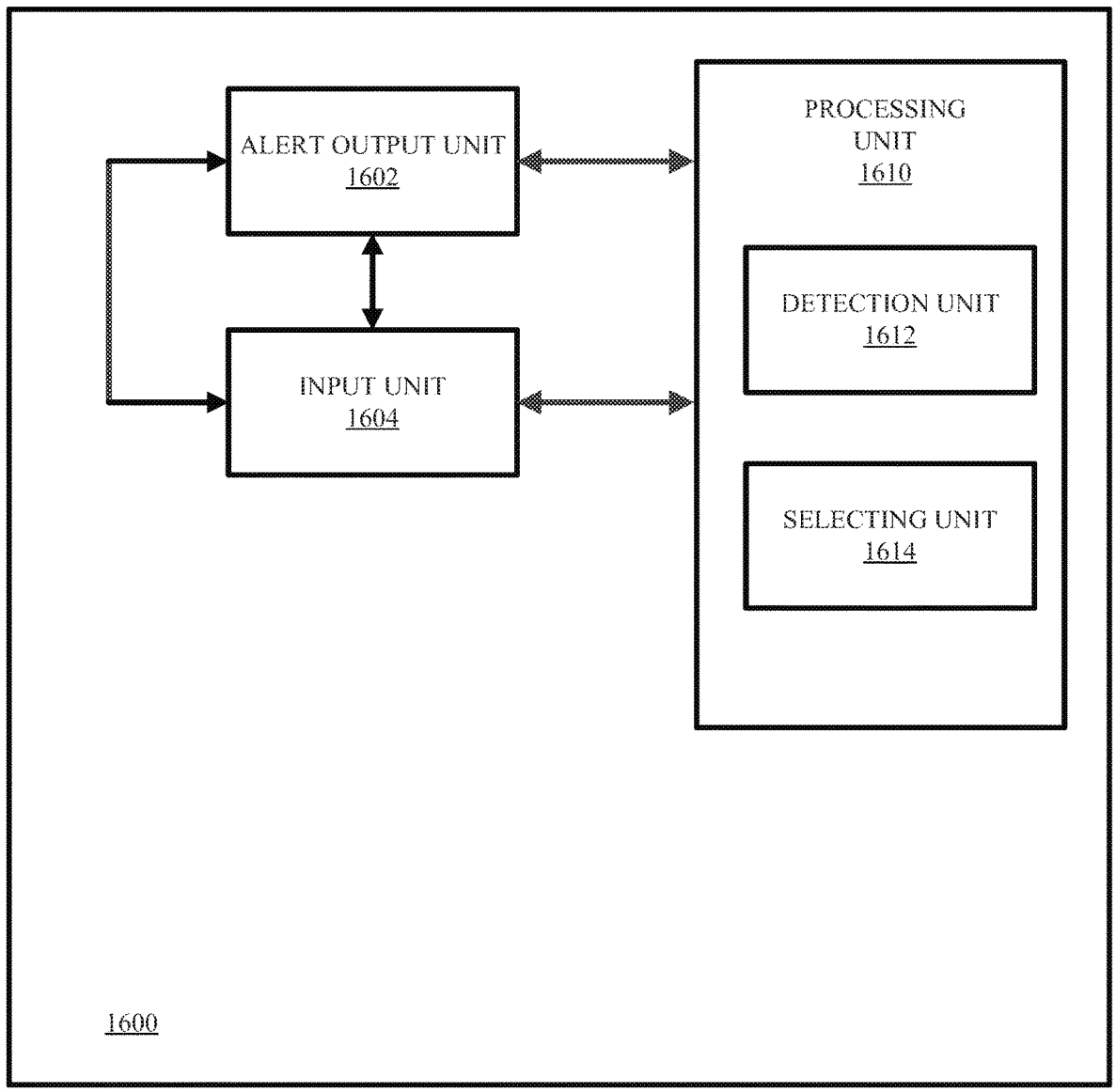

In accordance with some embodiments, FIG. 16 shows a functional block diagram of an electronic device 1600 configured in accordance with the principles of the various described embodiments. In particular, the electronic device 1600 can be used to perform the process 730 described above with respect to FIG. 7D. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes an alert output unit 1602 configured to output an alert, an input unit 1604 configured to receive an interaction from the user, and a processing unit 1610 coupled to the alert output unit 1602 and the input unit 1604. In some embodiments, the processing unit 1610 includes a detection unit 1612 configured cooperate with the input unit 1604 to detect an interaction received by the user, and a selecting unit 1614 configured to select a modified alert sequence.

The processing unit 1610 is configured to, output a portion of an alert sequence (e.g., using the alert output unit 1602). The alert sequence includes predetermined sequence of alert outputs. The processing unit 1610 is also configured to detect an interaction from the user (e.g., using the detecting unit) during the output of the portion of the alarm sequence (e.g., using the alert output unit 1602). In response to detecting the interaction, the processing unit 1610 is further configured to select a modified alert sequence (e.g., using the selecting unit 1614) in response to the input, and output the modified alert sequence (e.g., using the alert output unit 1602).

In some embodiments, the alert sequence includes a series of alarm outputs that escalate in intensity over time. In some embodiments, the modified alert sequence is a non-escalating alert sequence. In some embodiments, the alert sequence is a sequence of alerts that correspond to a single event. In some embodiments, the modified alert sequence is a silent alert sequence having no audio component. In some embodiments, the input received at the input unit 1604 includes a request to reduce an intrusiveness the portion of the alert sequence, and the modified alert sequence has a reduced intrusiveness. In some embodiments, the input received at the input unit 1604 includes a request to increase an intrusiveness of the portion of the alert sequence and the modified alert sequence has an increased intrusiveness.

Figure 17:
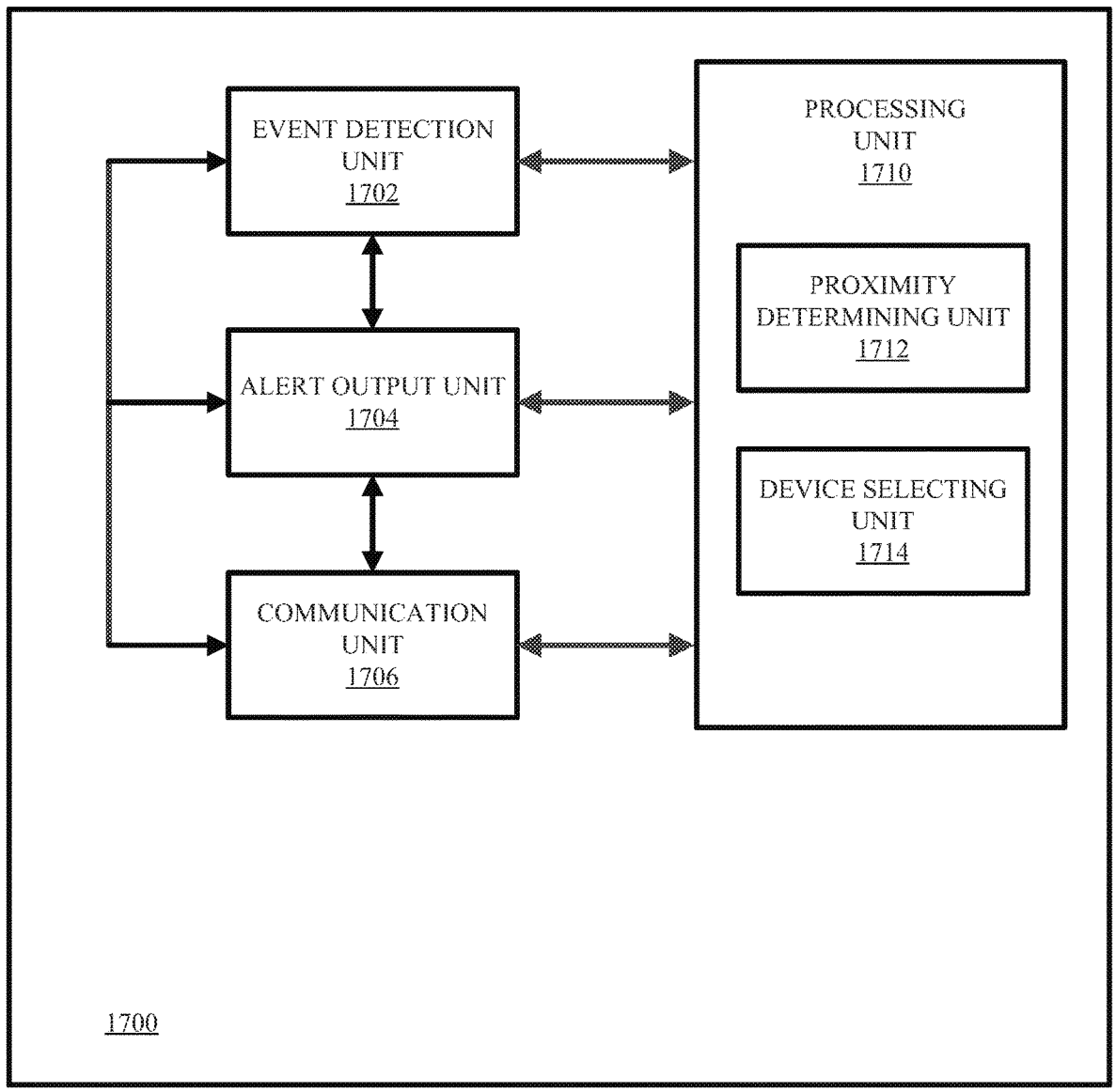

In accordance with some embodiments, FIG. 17 shows a functional block diagram of an electronic device 1700 configured in accordance with the principles of the various described embodiments. In particular, the electronic device 1700 can be used to perform the process 740 described above with respect to FIG. 7E. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes an event detection unit 1702 configured to detect an event, an alert output unit 1704 configured to output an alert, a communication unit 1706 that is configured to conduct communication between the electronic device and an external device, and a processing unit 1710 coupled to the event detection unit 1702 and the alert output unit 1704. In some embodiments, the processing unit 1710 includes a proximity determining unit 1712 configured to determine if a second device is proximate to the electronic device and a device selection unit 1714 configured to select a device to output an alert.

The processing unit 1710 is configured to detecting an event (e.g., using the event detection unit 1702). In response to detecting the event, the processing unit 1710 is configured to, in accordance with a determination that a second device is in proximity to the first device (e.g., using the proximity detection unit 1712), select an alert-output device (using the device selection unit 1714), and output the alert on the alert-output device (e.g., using the alert output unit 1704). In some embodiments, the alert is not output on a device that is not selected as the alert-output device. In some embodiments, the alert is relayed to the second device using the first device (e.g., using the communication unit 1706). In some embodiments, the first device is a mobile phone and the second device is a wearable computing device. In some embodiments, a communication channel is established between the second device and the first device using a pairing operation (e.g., using the communication unit).

In some embodiments, at least one additional device is in proximity to the first device, and the alert-output device is selected (e.g., using the device selecting unit 1714) from the first device, the second device, and the at least one additional device. In some embodiments, the alert-output device is selected (e.g., using the device selecting unit 1714) based on a user-provided prioritization. In some embodiments, if the user does not interact with the alert-output device after the alert is sent, then a second alert is sent using a device that was not selected as the alert-output device. In some embodiments, the first and second devices are updated in response to the detected event, and wherein the alert is only output on the selected alert-output device.

In some embodiments, the alert-output device is selected (e.g., using the device selection unit 1714) based on a usage of one or more of: the first device and the second device, wherein the usage includes a time of usage, and either the first or second device having a time of usage that is most recent is selected as the alert-output device.

In some embodiments, the alert-output device is selected (e.g., using the device selection unit 1714) based on a usage of one or more of: the first device and the second device, wherein the usage includes a time of usage and an amount of usage, and either the first or second device having an amount of usage that is greater over a predetermined time period is selected as the alert-output device.

In some embodiments, the alert-output device is selected (e.g., using the device selection unit 1714) based on a usage of one or more of: the first device and the second device, wherein the usage includes a type of usage, and either the first or second device having a type of usage that corresponds to a predetermined usage type is selected as the alert-output device.

Figure 18:
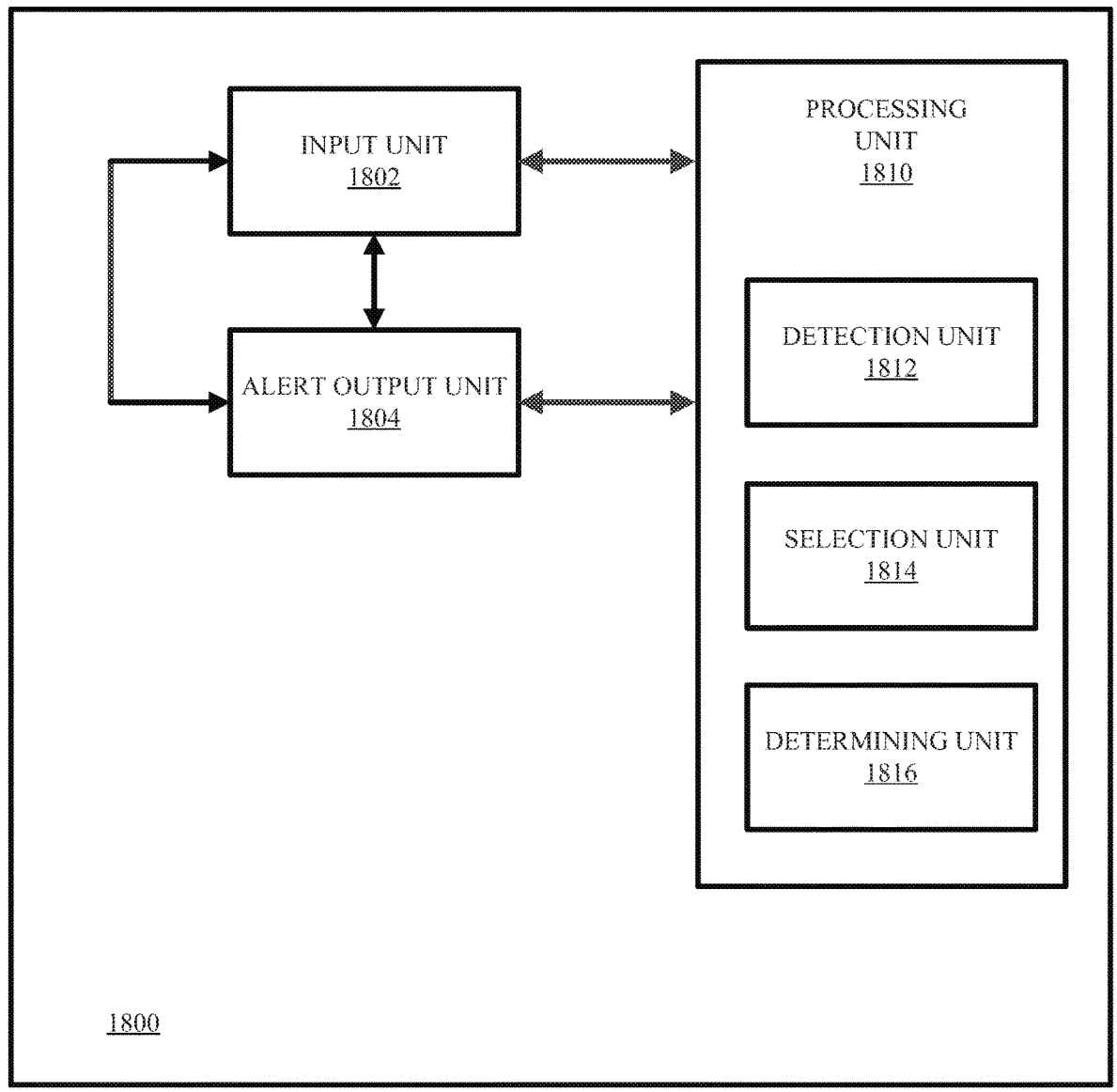

In accordance with some embodiments, FIG. 18 shows a functional block diagram of an electronic device 1800 configured in accordance with the principles of the various described embodiments. In particular, the electronic device 1800 can be used to perform the process 750 described above with respect to FIG. 7F. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 includes an input unit 1802 configured to receive an input from the user, an alert output unit 1804 configured to output an alert, and a processing unit 1810 coupled to the input unit 1802 and the alert output unit 1804. In some embodiments, the processing unit 1810 includes a detection unit 1812 configured cooperate with the input unit 1802 to detect a property of the input provided by the user, and a selecting unit 1814 configured to select a modified alert sequence.

The input unit 1802 is configured to receive a first input on the device, the first input being below an input threshold. In response to detecting the first input (e.g., using the detection unit 1812), the processing unit 1810 is configured to produce a first output (e.g., using the alert output unit 1804). The first output includes a haptic component for the first input that is coordinated with an audio component for the first input. The input unit 1802 is also configured to receive a second input on the device. The processing unit 1810 is configured to, in response to detecting the second input (e.g., using the detection unit 1812), produce a second output in response to the second input (e.g., using the alert output unit 1804). The processing unit 1810 is further configured to, in accordance with a determination that the second input is below the input threshold (e.g., using the determining unit 1816), produce a second output (e.g., using the alert output unit 1804), which includes a haptic component for the second input that is coordinated with an audio component for the second input. The processing unit 1810 is further configured to, in accordance with a determination that the second input is above the input threshold (e.g., using the determining unit 1816), produce a second output (e.g., using the alert output unit 1804) that includes a modified haptic component for the second input.

In some embodiments, the haptic component for the first input is synchronized with the audio component for the first input, if the second input is below the input threshold, the haptic component for the second input is synchronized with the audio component for the second input, and if the second input is above the input threshold, the haptic component for the second input is asynchronous with respect to the audio component for the second input. In some embodiments, the input threshold includes a speed threshold, the synchronous haptic is a discrete haptic output that corresponds to a discrete audio output, and the asynchronous haptic is a continuous haptic output.

In some embodiments, the input unit 1802 receives a first input and a second input that are rotation inputs. In some embodiments, the input unit 1802 receives a rotation that is a circular motion on a touch-sensitive region of the electronic device. In some embodiments, the input unit 1802 receives a rotation that is rotation of a physical knob integrated into the device. In some embodiments, the alert output unit 1804 produces an audio component that includes a series of click sounds that corresponds to changes in angular position of the knob. In some embodiments, the input unit 1802 receives a first input and second inputs that are scrolling inputs for a display of the electronic device. In some embodiments, the alert output unit 1804 produces an audio component that includes a series of click sounds that correspond to a movement through a list of items on the display of the electronic device.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A method for outputting alerts at an electronic device, comprising:
   detecting an alert condition; and
   in response to detecting the alert condition:
      in accordance with a determination that a user is not looking at the electronic device, generating a first haptic alert corresponding to the alert condition; and
      in accordance with a determination that the user is looking at the electronic device, generating a second haptic alert corresponding to the alert condition, the second haptic alert having at least one of a reduced duration or a reduced energy output compared to the first haptic alert.

2. The method of claim 1, further comprising determining whether the user is looking at the electronic device using an optical sensor.

3. The method of claim 1, wherein the determination that the user is looking at the electronic device comprises a determination that at least one of a location or a movement of an eye of the user is consistent with the user viewing the electronic device.

4. The method of claim 1, wherein the determination that the user is looking at the electronic device comprises a determination that a face of the user is near a display of the electronic device.

5. The method of claim 1, wherein:
   the first haptic alert has a first duration; and
   the second haptic alert has a second duration less than the first duration.

6. The method of claim 1, wherein:
   the first haptic alert has a first energy output; and
   the second haptic alert has a second energy output less than the first energy output.

7. An electronic device, comprising:
   a haptic device;
   an input device;
   one or more processors;
   memory; and
   one or more programs stored in the memory and configured to be executed by the one or more processors, and including instructions for:

detecting, using the one or more processors, an alert condition; and in response to detecting the alert condition:
- in accordance with a determination that a user is not looking at the electronic device, generating, by the haptic device, a first haptic alert corresponding to the alert condition; and
- in accordance with a determination that the user is looking at the electronic device, generating, by the haptic device, a second haptic alert corresponding to the alert condition, the second haptic alert having at least one of a reduced duration or a reduced energy output compared to the first haptic alert.

8. The electronic device of claim 7, wherein:
the input device is an optical sensor; and
the one or more programs further include instructions for determining whether the user is looking at the electronic device using the optical sensor.

9. The electronic device of claim 8, wherein the optical sensor is configured to sense at least one of a position or a movement of a user's eye.

10. The electronic device of claim 8, wherein the optical sensor is configured to sense a position of a user's face.

11. The electronic device of claim 7, wherein:
the first haptic alert has a first duration; and
the second haptic alert has a second duration less than the first duration.

12. A non-transitory computer readable storage medium storing one or more programs, the one or more programs comprising instructions, which when executed by an electronic device having one or more processors and memory, cause the electronic device to:

detect an alert condition; and in response to detecting the alert condition:
- in accordance with a determination that a user is not looking at the electronic device, generate a first haptic alert corresponding to the alert condition; and
- in accordance with a determination that the user is looking at the electronic device, generate a second haptic alert corresponding to the alert condition, the second haptic alert having at least one of a reduced duration or a reduced energy output compared to the first haptic alert.

13. The non-transitory computer readable storage medium of claim 12, wherein the instructions further cause the electronic device to determine whether the user is looking at the electronic device using an optical sensor.

14. The non-transitory computer readable storage medium of claim 12, wherein the determination that the user is looking at the electronic device comprises a determination that at least one of a location or a movement of an eye of the user is consistent with the user viewing the electronic device.

15. The non-transitory computer readable storage medium of claim 12, wherein the determination that the user is looking at the electronic device comprises a determination that a face of the user is near a display of the electronic device.

16. The non-transitory computer readable storage medium of claim 12, wherein:
the first haptic alert has a first duration; and
the second haptic alert has a second duration less than the first duration.

* * * * *